United States Patent
Vahala et al.

(10) Patent No.: US 6,907,169 B2
(45) Date of Patent: Jun. 14, 2005

(54) POLARIZATION-ENGINEERED TRANSVERSE-OPTICAL-COUPLING APPARATUS AND METHODS

(75) Inventors: Kerry J. Vahala, San Gabriel, CA (US); Peter C. Sercel, Pasadena, CA (US); Oskar J. Painter, Pasadena, CA (US); David W. Vernooy, Sierra Madre, CA (US); David S. Alavi, Eugene, OR (US)

(73) Assignee: Xponent Photonics Inc, Monrovia, CA (US)

( * ) Notice: Subject to any disclaimer, the term of this patent is extended or adjusted under 35 U.S.C. 154(b) by 266 days.

(21) Appl. No.: 10/284,041

(22) Filed: Oct. 30, 2002

(65) Prior Publication Data
US 2003/0081903 A1 May 1, 2003

Related U.S. Application Data
(60) Provisional application No. 60/335,656, filed on Oct. 30, 2001.

(51) Int. Cl.$^7$ ................................................. G02B 6/26
(52) U.S. Cl. ............................. 385/50; 385/11; 385/28; 385/43
(58) Field of Search ............................. 385/11, 27, 28, 385/30, 31, 39, 40–43, 48–50

(56) References Cited

U.S. PATENT DOCUMENTS

| | | |
|---|---|---|
| 3,912,363 A | 10/1975 | Hammer |
| 4,097,117 A | 6/1978 | Neil et al. |
| 4,097,118 A | 6/1978 | Hammer |
| 4,142,775 A | 3/1979 | Ramaswamy et al. |
| 5,039,192 A | 8/1991 | Basu |
| 5,138,676 A | 8/1992 | Stowe et al. |
| 5,446,579 A | 8/1995 | Lomashevitch |
| 5,475,704 A | 12/1995 | Lomashevitch |
| 5,502,783 A | 3/1996 | Wu |
| 5,515,461 A | 5/1996 | Deri et al. |

(Continued)

OTHER PUBLICATIONS

F. Agahi, B. Pezeshki, J. A. Kash, and D. W. Kisker, "Asymmetric Fabry–Perot modulator with a waveguide geometry", Electron. Lett. vol. 32(3) 210 (1996).

Carl Arft, Diego R. Yankelovich, Andre Knoesen, Erji Mao, and James S. Harris Jr., "In–line fiber evanescent field electrooptic modulators", Journal of Nonlinear Optical Physics and Materials vol. 9(1) 79 (2000).

(Continued)

*Primary Examiner*—John D. Lee
(74) *Attorney, Agent, or Firm*—David S. Alavi; Christie Parker & Hale LLP

(57) ABSTRACT

An optical signal may be received into orthogonal linearly polarized modes of a transmission optical waveguide, the transmission waveguide including first and second transverse-coupling segments thereof. Optical signal polarized along one polarization direction may be substantially completely transferred from the transmission waveguide into a first transverse-coupled waveguide, the first transverse-coupled waveguide being optically transverse-coupled to the first transverse-coupling segment of the transmission waveguide. Optical signal polarized along the other polarization direction may be substantially completely transferred from the transmission waveguide into a second transverse-coupled waveguide, the second transverse-coupled waveguide being optically transverse-coupled to the second transverse-coupling segment of the transmission waveguide. The optical signals carried by the first and second transverse-coupled waveguides may be combined into a single waveguide. The polarization directions of the transmission waveguide may be rotated about 90° between the first and second transverse-coupling segments.

56 Claims, 13 Drawing Sheets

U.S. PATENT DOCUMENTS

| | | | |
|---|---|---|---|
| 5,703,989 | A | | 12/1997 Khan et al. |
| 5,818,980 | A | * | 10/1998 Herrmann ............... 385/11 |
| 5,926,496 | A | | 7/1999 Ho et al. |
| 6,009,115 | A | | 12/1999 Ho |
| 6,031,945 | A | | 2/2000 You et al. |
| 6,052,495 | A | | 4/2000 Little et al. |
| 6,222,964 | B1 | | 4/2001 Sadot et al. |
| 6,282,219 | B1 | | 8/2001 Butler et al. |
| 6,310,995 | B1 | | 10/2001 Saini et al. |
| 6,330,378 | B1 | | 12/2001 Forrest et al. |
| 6,339,607 | B1 | | 1/2002 Jiang et al. |
| 6,356,694 | B1 | | 3/2002 Weber |
| 6,400,856 | B1 | | 6/2002 Chin |
| 6,424,669 | B1 | | 7/2002 Jiang et al. |
| 6,445,724 | B2 | | 9/2002 Abeles |
| 6,507,684 | B2 | | 1/2003 Tapalian et al. |
| 6,560,259 | B1 | | 5/2003 Hwang |
| 2002/0081055 | A1 | | 6/2002 Painter et al. |
| 2002/0122615 | A1 | | 9/2002 Painter et al. |
| 2003/0081902 | A1 | | 5/2003 Blauvelt et al. |
| 2003/0235369 | A1 | | 12/2003 Grosjean et al. |

OTHER PUBLICATIONS

C. I. H. Ashby, M. M. Bridges, A. A. Allerman, B. E. Hammons, "Origin of the time dependence of wet oxidation of AlGaAs", Appl. Phys. Lett. vol. 75(1) 73 (1999).

W. G. Bi and C. W. Tu, "Bowing parameter of the band–gap energy of GaNxAs1–x", Appl. Phys. Lett. vol. 70(12) 1608 (1997).

P. Chavarkar, L. Zhao, S. Keller, A. Fisher, C. Zheng, J. S. Speck, and U. K. Mishra, "Strain relaxation of InxGa1–xAs during lateral oxidation of underlying AlAs layers", Appl. Phys. Lett. vol. 75(15) 2253 (1999).

E. I. Chen, N. Holonyak, Jr., andM. J. Ries, "Planar disorder– and native–oxide–defined photopumped AlAs–GaAs superlattice minidisk lasers", J. Appl. Phys. vol. 79(11) 8204 (1996).

K. D. Choquette, K. M. Geib, C. I. H. Ashby, R. D. Twesten, O. Blum, H. Q. Hou, D. M. Follstaedt, B. E. Hammons, D. Mathes, and R. Hull, "Advances in selective wet oxidation of AlGaAs alloys", IEEE Journal of Selected Topics in Quantum Electronics vol. 3(3) 916 (1997).

R. H. Homg, D. S. Wuu, S.C. Wei, M. F. Huang, K.H. Chang, P.H. Liu and K. C. Lin "AlGaInP/AuBe/glass light emitting diodes fabricated by wafer–bonding technology", Appl. Phys. Letts. vol. 75(2) 154 (1999).

D.L. Huffaker, H. Deng, Q. Deng, and D.G. Deppe, "Ring and stripe oxide–confined vertical–cavity surface–emitting lasers", Appl. Phys. Lett., vol. 69(23), 3477 (1996).

B. Koley, F. G. Johnson, O. King, S. S. Saini, and M. Dagenais, "A method of highly efficient hydrolization oxidation of III–V semiconductor lattice matched to indium phosphide", Appl. Phys. Lett. vol. 75(9) 1264 (1999).

M. Kondow, T. Kitatani, S. Nakatsuka, M. C. Larson, K. Nakahara, Y. Yazawa, M. Okai, and K. Uomi, "GaInNAs: A novel material for long–wavelength semiconductor lasers", IEEE Journal of Selected Topics in Quantum Electronics, vol. 3(3), 719 (1997).

B.A. Little, S.T. Chu, H. A. Haus, J. Foresi, and J.–P. Laine, "Microring channel dropping filters", J. Lightwave Technology vol. 15 998 (1997).

Y. Luo, D. C. Hall, L. Kou, L. Steingart, J. H. Jackson, O. Blum, and H. Hou, "Oxidized AlxGa1–xAs heterostructures planar waveguides", Appl. Phys. Lett. vol. 75(20) 3078 (1999).

M. H. MacDougalP. D. Dapkus, A. E. Bond, C.–K. Lin, and J. Geske, "Design and fabrication of VCSEL's with Alx-Oy–GaAs DBR's", IEEE Journal of Selected Topics in Quantum Electronics vol. 3(3) 905 (1997).

M. H. MacDougal, P. D. Dapkus, "Wavelength shift of selectively oxidized AlxOy–AlGaAs–GaAs distributed Bragg reflectors", IEEE Photonics Tech. Lett. vol. 9(7) 884 (1997).

R. L. Naone and L. A. Coldren, "Surface energy model for the thickness dependence of the lateral oxidation of AlAs", J. Appl. Phys. vol. 82(5) 2277 (1997).

N. Ohnoki, F. Koyama, and K. Iga, "Superlattice AlAs/AlInAs–oxide current aperture for long wavelength InP–based vertical–Cavity surface–emitting laser structure", Appl. Phys. Lett. vol. 73(22) 3262 (1998).

N. Ohnoki, F. Koyama and K. Iga, "Super–lattice AlAs/AlInAs for lateral–oxide current confinement in InP–based lasers", J. Crystal Growth vol. 195 603 (1998).

R. D. Pechstedt, P. St. J. Russell, T. A. Birks, and F. D. Lloyd–Lucas, "Selective coupling of fiber modes with use of surface–guided Bloch modes supported by dielctric multilayer stacks", J. Opt. Soc. Am. A vol. 12(12) 2655 (1995).

R. D. Pechstedt, P. St. J. Russell, " Narrow–band in–line fiber filter using surface–guided Bloch modes supported by dielectric multilayer stacks", J. Lightwave Tech. vol. 14(6) 1541 (1996).

B. Pezeshki, J. A. Kash, D. W. Kisker, and F. Tong, "Multiple wavelength light source using an asymmetric waveguide coupler", Appl. Phys. Lett. vol. 65(2) 138 (1994).

B. Pezeshki, J. A. Kash, D. W. Walker, and F. tong, "Wavelength sensitive tapered coupler with anti–resonant waveguides", IEEE Phot. Tech. Lett. vol. 6(10) 1225 (1994).

B. Pezeshki, F. F. Tong, J. A. Kash, and D. W. Kisker, "Vertical cavity devices as wavelength selective waveguides", J. Lightwave Tech. vol. 12(10) 1791 (1994).

B. Pezeshki, J. A. Kash, and F. Agahi, "Waveguide version of an asymmetric Fabry–Perot modulator", Appl. Phys. Lett. vol. 67(12) 1662 (1995).

H. Saito, T. Makimoto, and N. Kobayashi, "MOVPE growth of strained InGaAsN/GaAs quantum wells", J. Crystal Growth, vol. 195 416 (1998).

I.–H. Tan, C. Reaves, A. L. Holmes Jr., E. L. Hu, J. E. Bowers, and S. DenBaars, "Low–temperature bonding of III–V semiconductors", Electronics Letters 31 588 (1995).

H. Wada and T. Kamijoh, "Effects of heat treatment on bonding properties in InP–to–Si direct wafer bonding", Japanese Journal of Applied Physics Part 1 33 4878 (1994).

H. Wada, T. Kamijoh, and Y. Ogawa, "Direct bonding of InP to different materials for optical devices", Proceedings of the 3rd International Symposium on Semiconductor Wafer Bonding Science, Technology, and Applications, 95–97 579, The Electrochemical Society (Pennington NJ, 1995).

H. Wada and T. Kamijoh, "Room–temperature cw operation of InGaAsP lasers on Si fabricated by wafer bonding", IEEE Photonics Technology Letters 8 173 (1996).

H. Wada and T. Kamijoh, "Wafer bonding on InP to Si and its application to optical devices", Japanese Journal of Applied Physics Part 1 37 1383 (1998).

Z. J. Wang, S.-J. Chua, F. Zhou, W. Wang, and R. H. Wu, "Buried heterostructures InGaAsP/InP strain–compensated multiple quantum well laser with a native–oxidized InAlAs current blocking layer", Appl. Phys. Lett. vol. 73(26) 3803 (1998).

H. P. Xin and C. W. Tu, "GaInNAs/GaAs multiple quantum wells grown by gas–source molecular beam epitaxy", Appl. Phys Lett. vol. 72(19) 2442 (1998).

E. Yablonovitch, T. Sands, D. M. Hwang, I. Schnitzer, T. J. Gmitter, S. K. Shastry, D. S. Hill, and J. C. C. Fan, "Van der Waals bonding of GaAs on Pd leads to a permanent, solid–phase–topotaxial, metallurgical bond", Applied Physics Letters 59 3159 (1991).

Pochi Yeh, Amnon Yariv, and Chi–Shain Hong, "Electromagnetic propagation in periodic stratified media. I. General theory", J. Optical Soc. Am., vol. 67(4) 423 (1977).

Z–F. Xiao, G.–Y. Wu, D. Zhang, G. Zhang, Z.–H. Li, Y–L. Hao. and Y.–Y. Wang, "Silicon/glass wafer–to–wafer bonding with Ti/Ni intermediate bonding", Sensors and Actuators A—Physical 71 123 (1998).

* cited by examiner

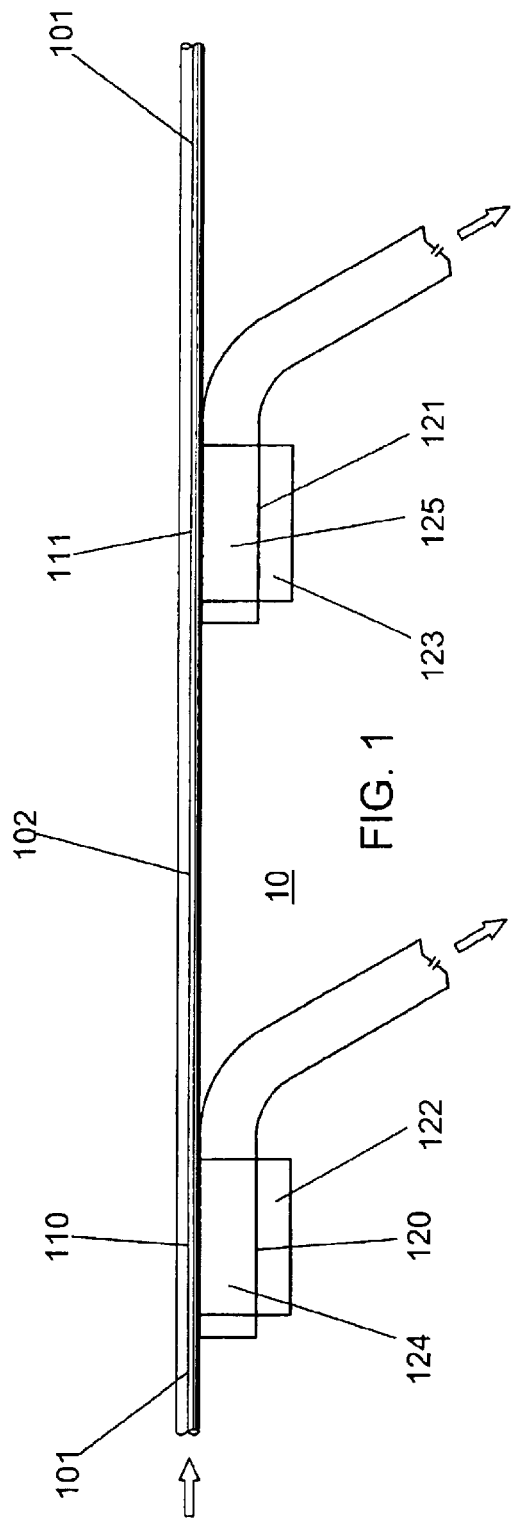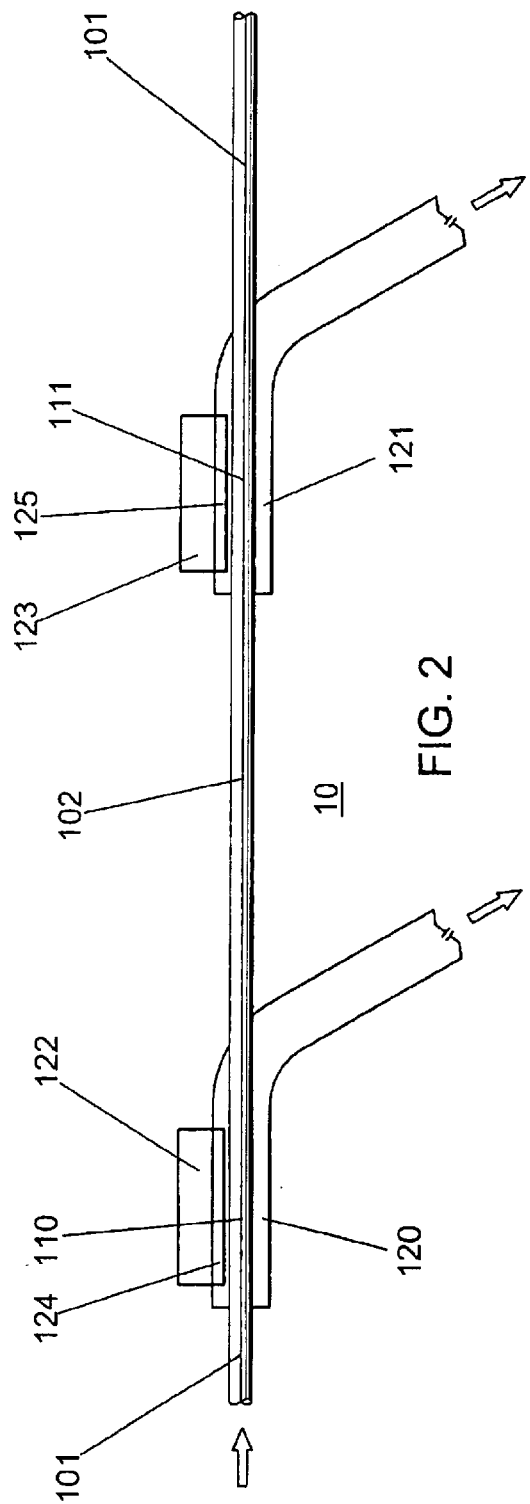

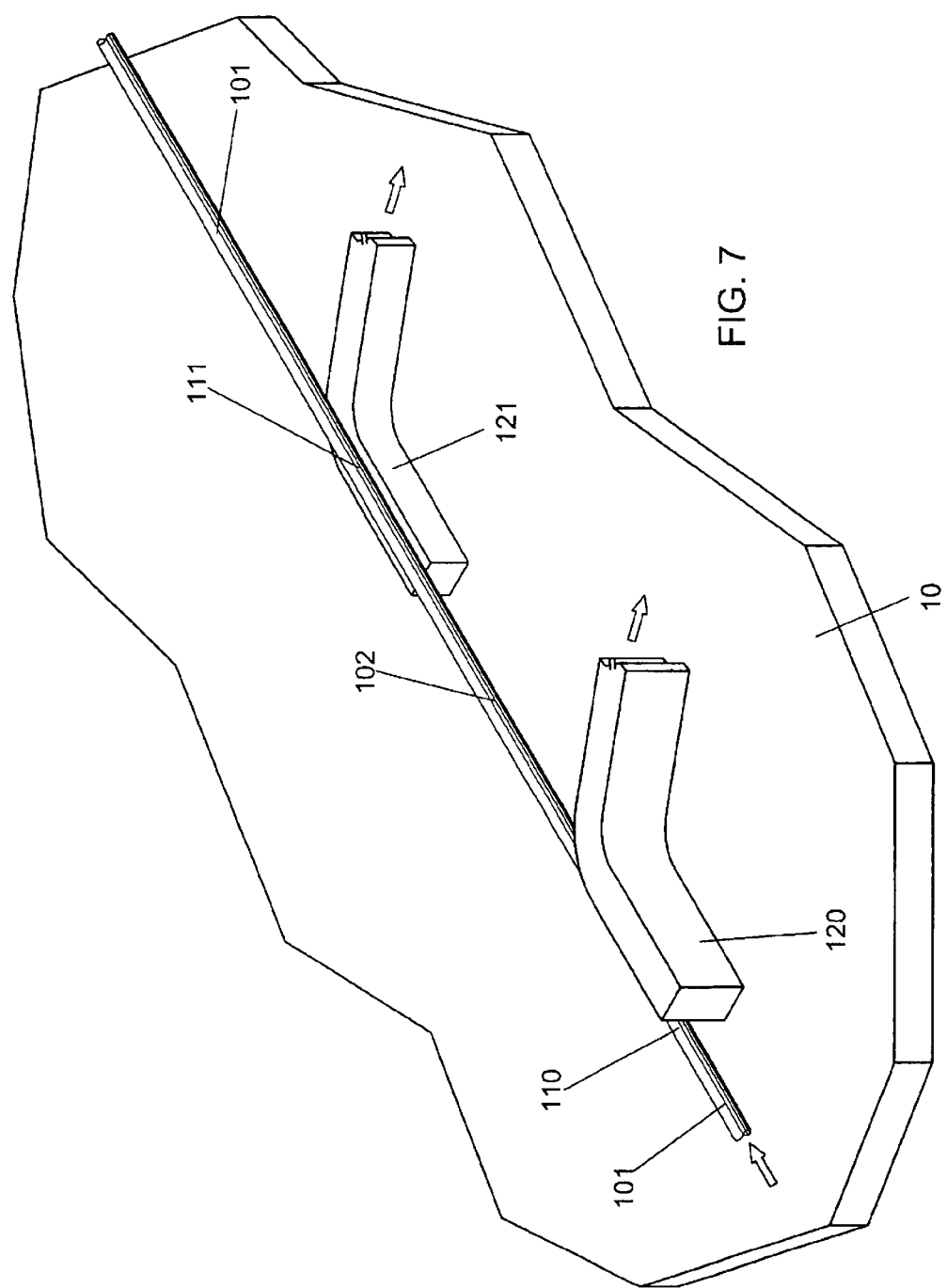

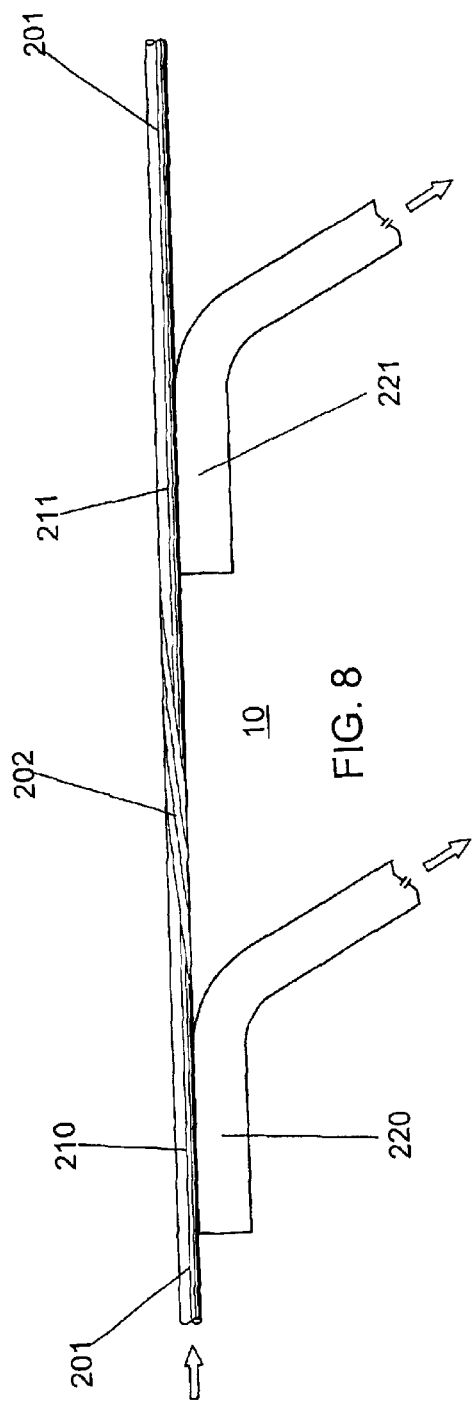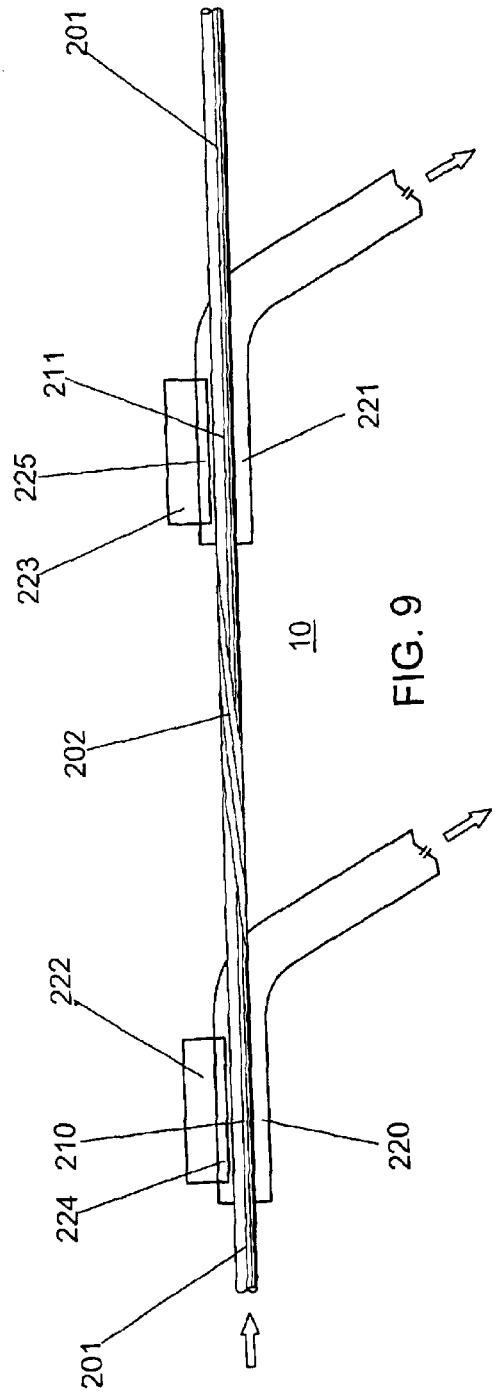

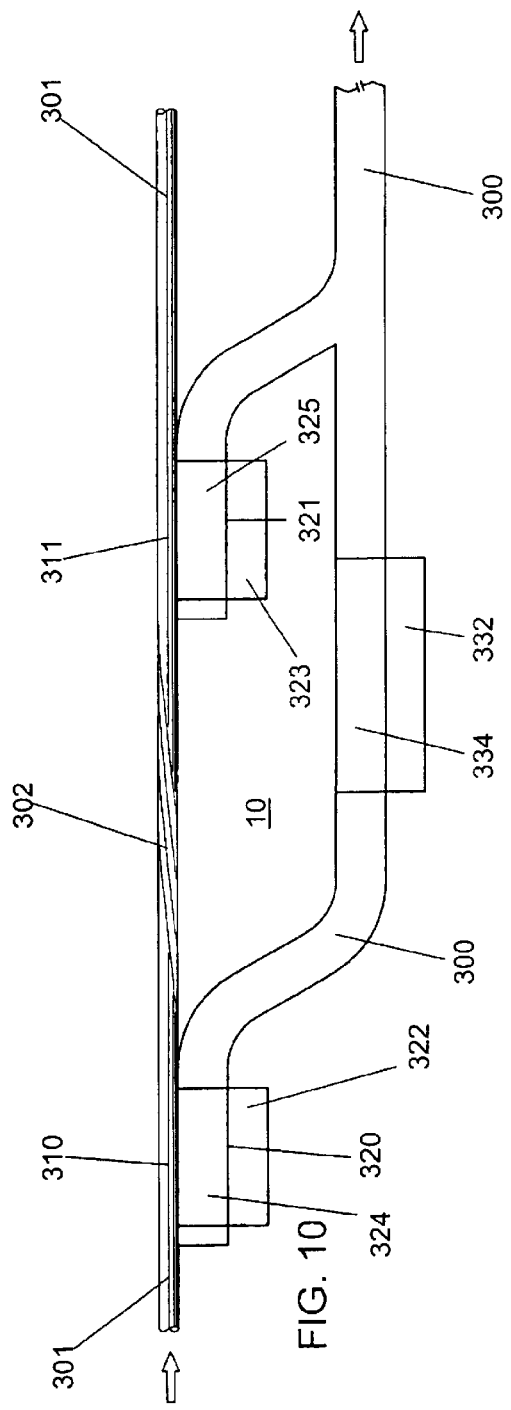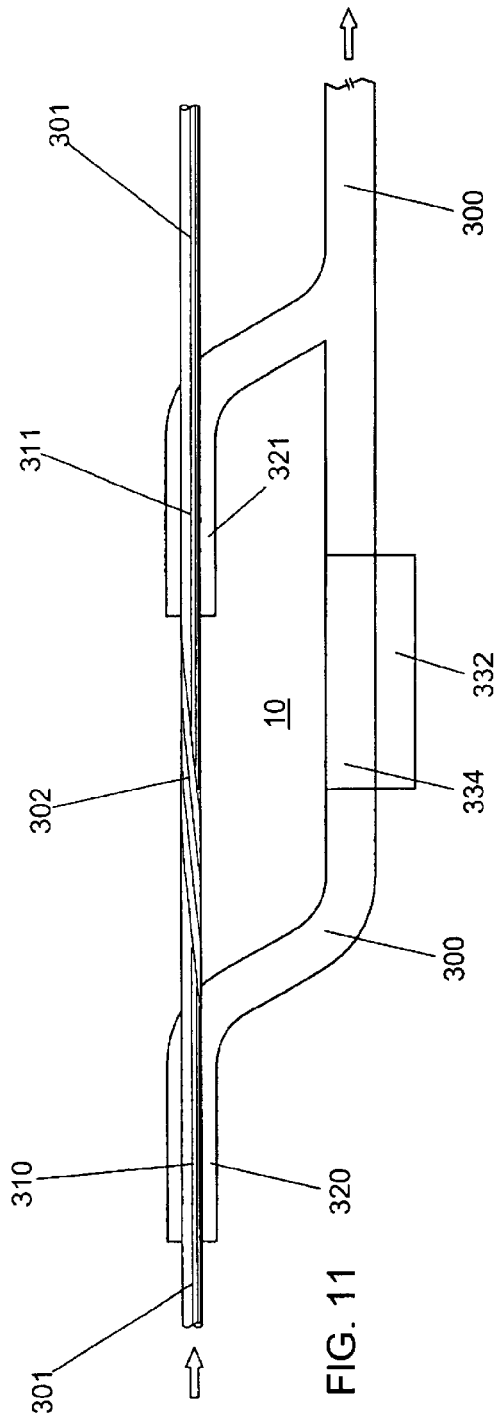

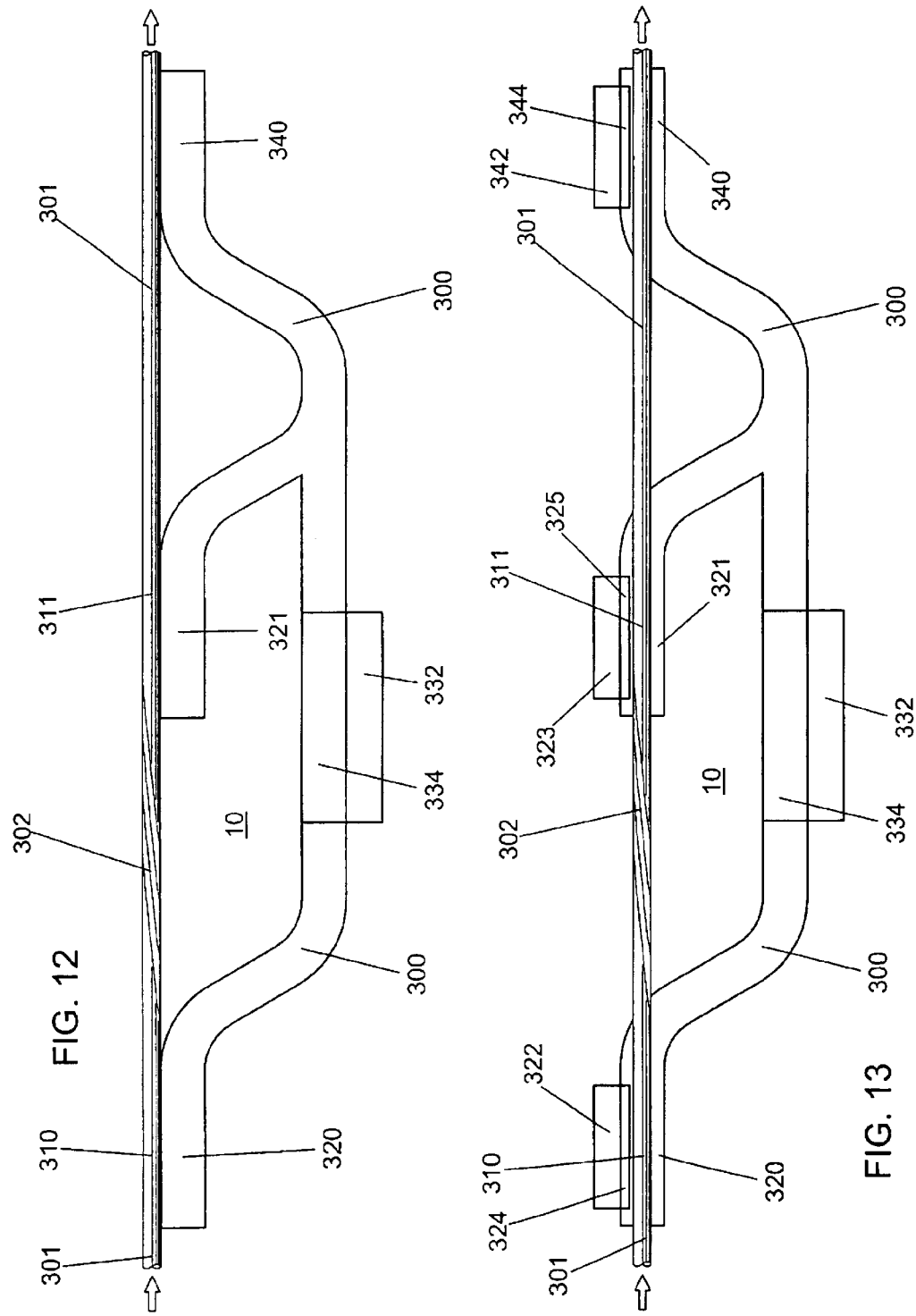

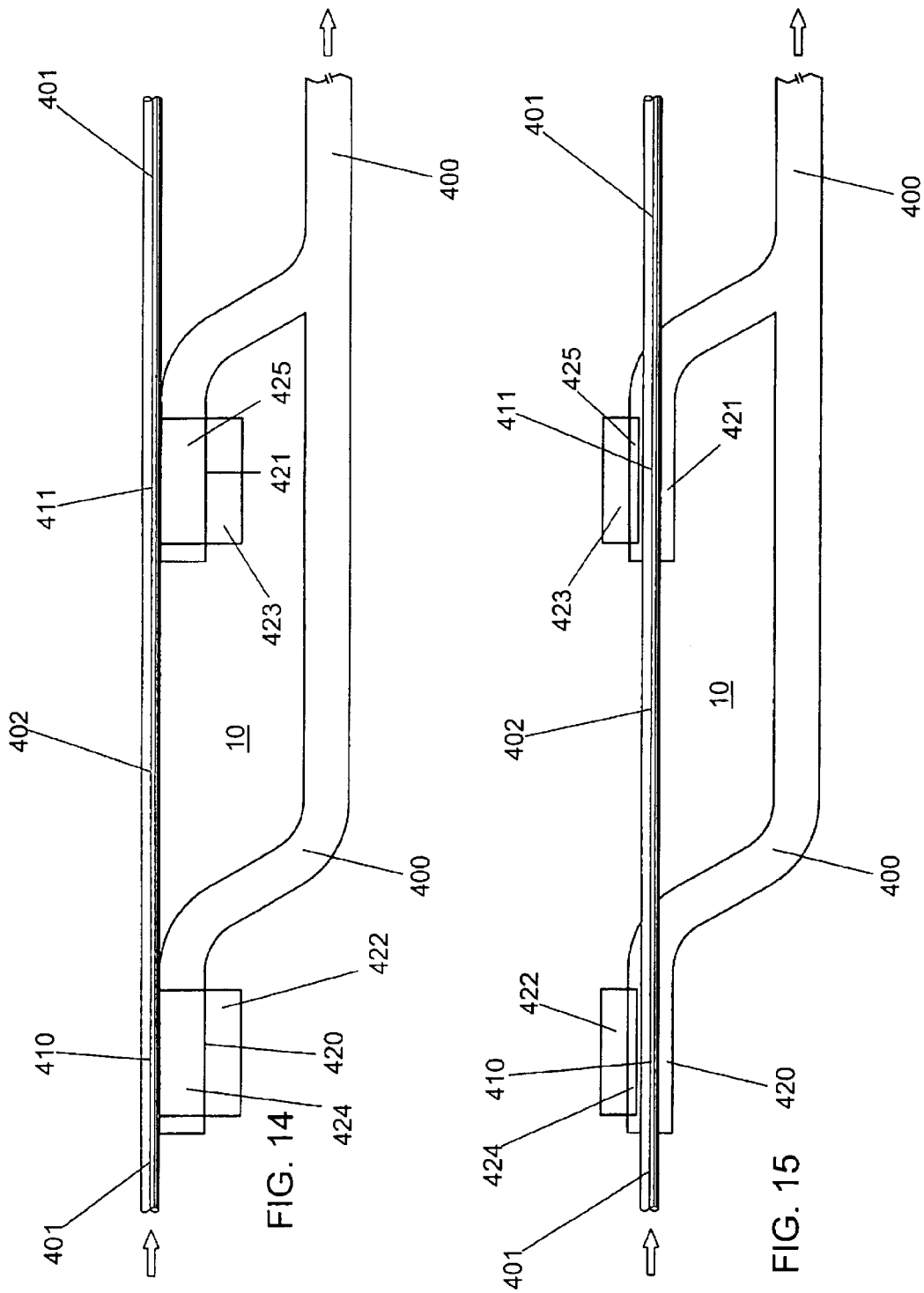

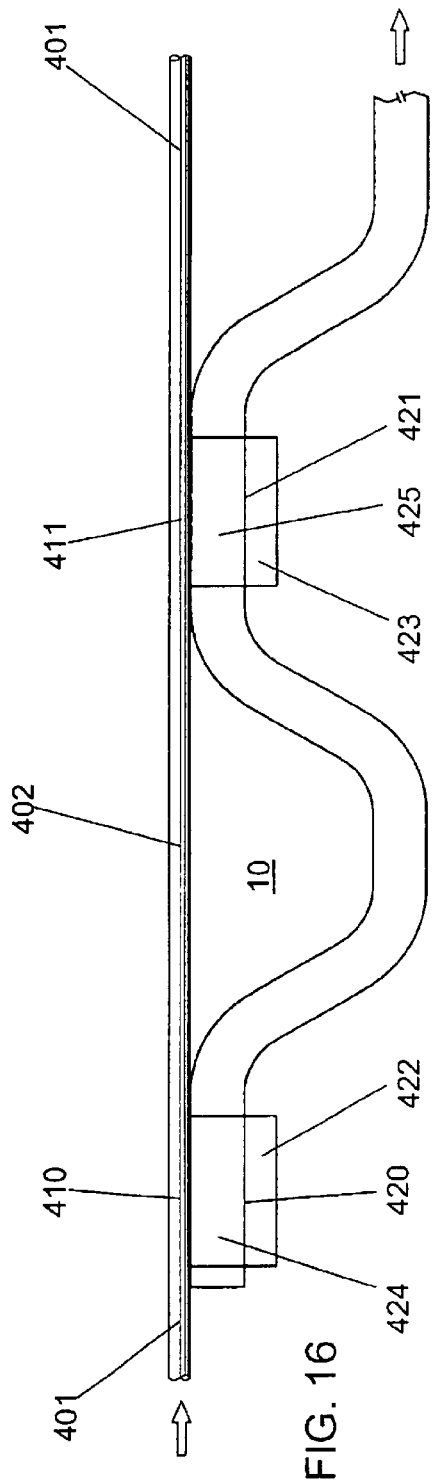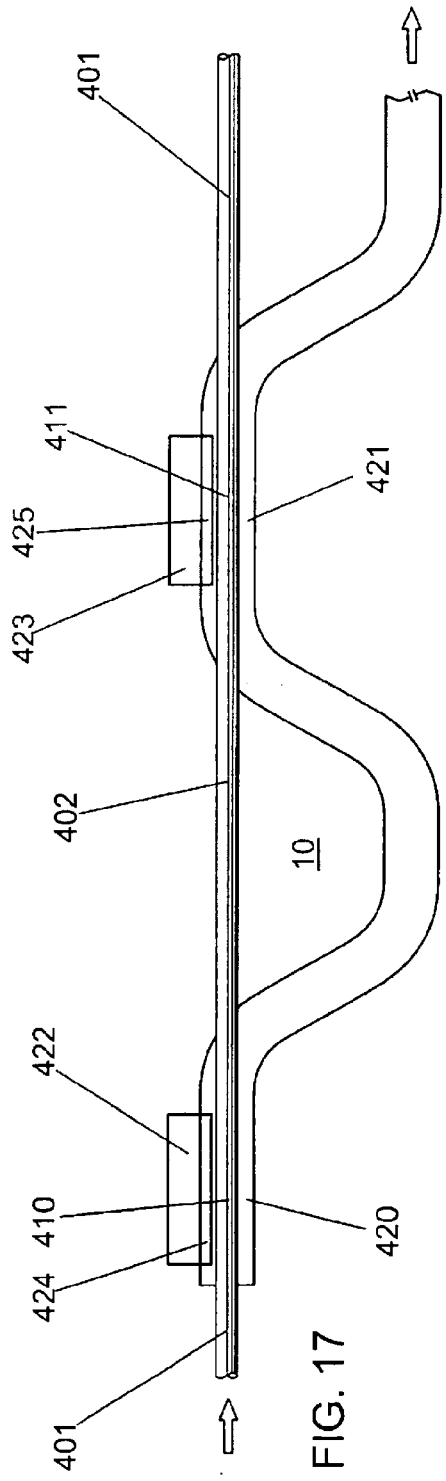

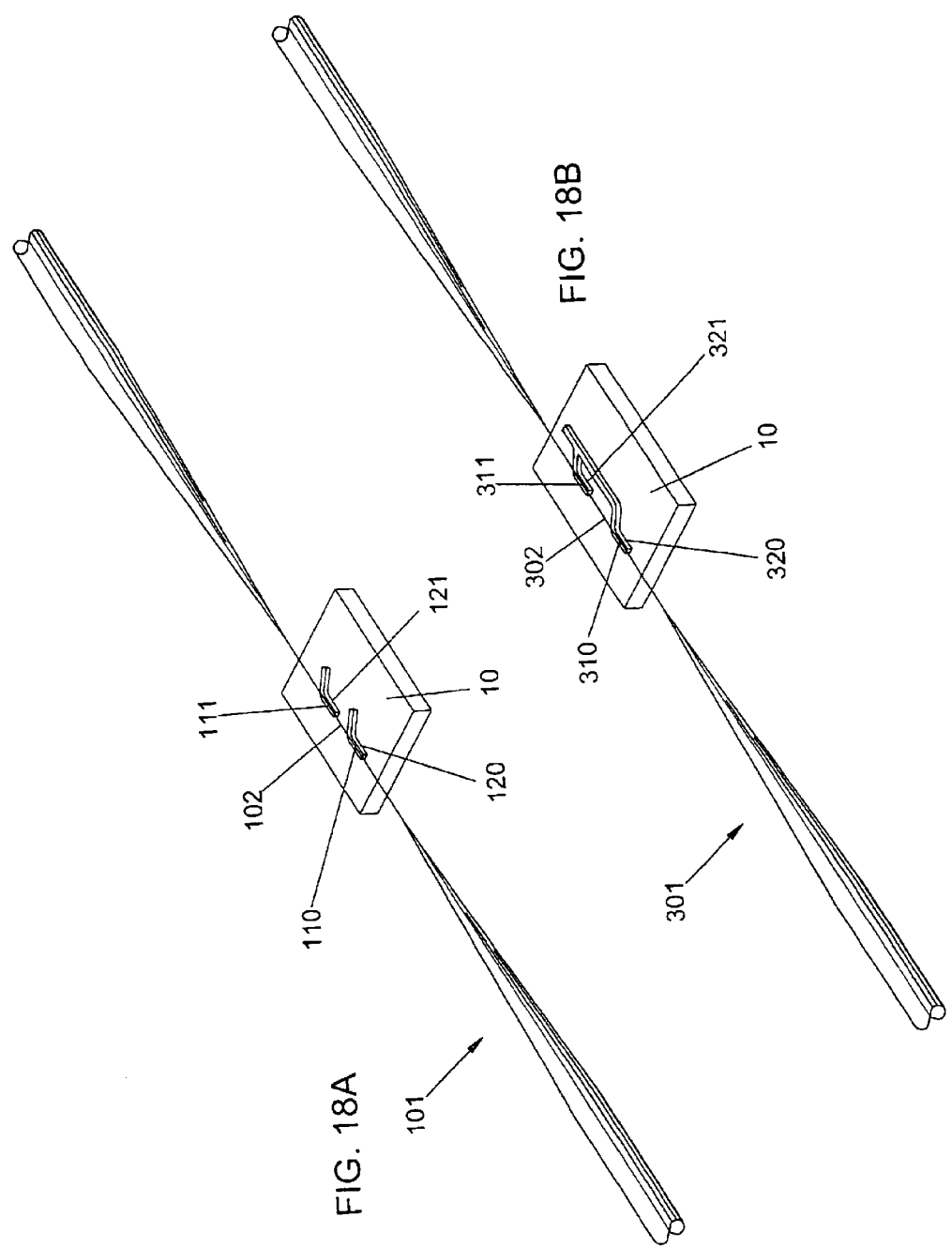

POLARIZATION-ENGINEERED TRANSVERSE-OPTICAL-COUPLING APPARATUS AND METHODS

RELATED APPLICATIONS

This application claims benefit of prior-filed co-pending U.S. provisional App. No. 60/335,656 entitled "Polarization-engineered transverse optical coupling apparatus and methods" filed Oct. 30, 2001 in the names of Kerry J. Vahala, Peter C. Sercel, Oskar J. Painter, David W. Vernooy, and David S. Alavi, said provisional application being hereby incorporated by reference as if fully set forth herein.

FIELD OF THE INVENTION

The field of the present invention relates to transverse optical couplers. In particular, transverse optical couplers are described herein having specifically engineered polarization-dependent operating characteristics.

BACKGROUND

This application is related to subject matter disclosed in:

U.S. provisional App. No. 60/257,218 entitled "Waveguides and resonators for integrated optical devices and methods of fabrication and use thereof" filed Dec. 21, 2000 in the name of Oskar J. Painter;

U.S. provisional App. No. 60/301,519 entitled "Waveguide-fiber Mach-Zender interferometer and methods of fabrication and use thereof" filed Jun. 27, 2001 in the names of Oskar J. Painter, David W. Vernooy, and Kerry J. Vahala;

U.S. provisional App. No. 60/335,656 entitled "Polarization-engineered transverse optical coupling apparatus and methods" filed Oct. 30, 2001 in the names of Kerry J. Vahala, Peter C. Sercel, Oskar J. Painter, David W. Vernooy, and David S. Alavi;

U.S. non-provisional App. No.10/037,966 entitled "Multi-layer dispersion-engineered waveguides and resonators" filed Dec. 21, 2001 in the names of Oskar J. Painter, David W. Vernooy, and Kerry J. Vahala, said application being hereby incorporated by reference in its entirety as if fully set forth herein;

U.S. provisional App. No. 60/334,705 entitled "Integrated end-coupled transverse-optical-coupling apparatus and methods" filed Oct. 30, 2001 in the names of Henry A. Blauvelt, Kerry J. Vahala, Peter C. Sercel, Oskar J. Painter, and Guido Hunziker;

U.S. provisional App. No. 60/333,236 entitled "Alignment apparatus and methods for transverse optical coupling" filed Nov. 23, 2001 in the names of Charles I. Grosjean, Guido Hunziker, Paul M. Bridger, and Oskar J. Painter;

U.S. provisional App. No. 60/360,261 entitled "Alignment-insensitive optical junction apparatus and methods employing adiabatic optical power transfer" filed Feb. 27, 2002 in the names of Henry A. Blauvelt, Kerry J. Vahala, David W. Vernooy, and Joel S. Paslaski; and U.S. non-provisional App. No. 10/187,030 entitled "Optical junction apparatus and methods employing optical power transverse-transfer" filed Jun. 28, 2002 in the names of Henry A. Blauvelt, Kerry J. Vahala, David W. Vernooy, and Joel S. Paslaski.

This application is also related to subject matter disclosed in the following publications, each of said publications being hereby incorporated by reference in its entirety as if fully set forth herein:

P1) R. D. Pechstedt, P. St. J. Russell, T. A. Birks, and F. D. Lloyd-Lucas, "Selective coupling of fiber modes with use of surface-guided Bloch modes supported by dielectric multilayer stacks", J. Opt. Soc. Am. A Vol.12 (12) 2655 (1995);

P2) R. D. Pechstedt, P. St. J. Russell, "Narrow-band in-line fiber filter using surface-guided Bloch modes supported by dielectric multilayer stacks", J. Lightwave Tech. Vol.14(6) 1541 (1996);

P3) Carl Arft, Diego R. Yankelovich, Andre Knoesen, Erji Mao, and James S. Harris Jr., "In-line fiber evanescent field electrooptic modulators", Journal of Nonlinear Optical Physics and Materials Vol. 9(1) 79 (2000); and P4) Pochi Yeh, Amnon Yariv, and Chi-Shain Hong, "Electromagnetic propagation in periodic stratified media. I. General theory", J. Optical Soc. Am., Vol. 67(4) 423 (1977).

Transverse optical coupling (also referred to as transverse coupling, evanescent optical coupling, evanescent coupling, directional optical coupling, directional coupling, transverse optical power transfer, transverse transfer) is discussed at length in several of the prior patent applications cited hereinabove, and the discussion need not be repeated herein. The efficiency of transverse optical coupling is determined by the degree of transverse overlap between an optical mode of the device and an optical mode of the waveguide (characterized by a coupling coefficient κ), by the propagation distance over which the modes overlap (i.e., interaction length L), and by the degree of modal index mismatch for so-called mode-interference transverse coupling (characterized by $\Delta\beta=\beta1-\beta2$, the β's being the propagation constants for the respective optical modes). Techniques and devices for efficient transverse optical coupling between a fiber-optic taper and a modal-index-matched optical waveguide fabricated on a substrate have been developed recently and may find applicability in the telecommunications industry. Examples include semiconductor-based multi-layer-reflector (MLR) waveguides and/or resonators, as disclosed in earlier-cited application Ser. No. 10/037,966, and methods and apparatus disclosed herein may be suitable for other transversely-optically-coupled optical components as well. External-coupling waveguides for modal-index-matched transverse optical coupling between optical devices and transmission waveguides are disclosed in earlier-cited application Ser. Nos. 60/334,705; 60/360,261; and 10/187, 030. Transverse-coupled components may include waveguides wherein confinement of waveguide optical modes is achieved by lower-index cladding layers surrounding a core, distributed Bragg reflection, reflection from metal coatings, reflection from dielectric coatings, reflection from multi-layer coatings, and/or internal reflection at an air/waveguide interface. In order to attain the full potential of many devices employing transverse optical coupling, polarization-dependent behavior of the transverse optical coupling and/or polarization-dependent optical propagation in one or more of the coupled optical components should preferably be suitably engineered for achieving the desired device performance.

In the field of optical-fiber-based telecommunications, optical signals are generated and launched into an optical fiber for transmission to another location. The optical signal may propagate over long distances (hundreds or even thousands of kilometers), usually carried by single-mode optical fiber. Such optical fiber does not typically preserve the polarization state of the propagating optical signal, which generally appears at the far end of the fiber in an arbitrary polarization state. As disclosed in the above-cited applications, the optical signal may be most efficiently transferred between the optical fiber and signal receiving and/or processing devices (which may be optical and/or electronic devices) by transverse optical coupling between a tapered section of the optical fiber and a modal-index-matched-optical-waveguide input section of the signal receiving/processing device. Other types of waveguides may also be employed for transverse-coupling.

Achieving modal-index-matched propagation of an optical signal within the fiber-optic taper and the waveguide may be achieved in a variety of ways. One particularly applicable technique involves the use of multi-layer reflector (MLR) optical components (waveguides and/or resonators) fabricated on a substrate, as disclosed in earlier-cited application Ser. No. 10/037,966. Such waveguides may be engineered so as to exhibit modal indices for supported optical modes that are near the modal index of the optical mode propagating in the fiber-optic taper. Precise modal-index-matching of the MLR optical component and the fiber-optic taper (and therefore also optimum transverse optical coupling) may be achieved by suitably precise design and fabrication of the MLR optical component (passive modal-index-matching) and/or by application of a control bias voltage across the MLR optical component, thereby using electro-optic properties of the MLR optical component to shift its modal index to match that of the fiber-optic taper (active modal-index-matching).

However, the two substantially orthogonally linearly-polarized optical modes supported by a MLR optical component (i.e., designated as TE and TM modes) typically have differing modal indices, making it unlikely that both modes could be modal-index-matched to the fiber-optic taper simultaneously. Since only one of these modes would be modal-index-matched, the optical signal power would be efficiently transferred to the MLR optical component from only one of two substantially orthogonally linearly-polarized optical modes of the fiber-optic taper. The rest of the optical signal (carried by the other linearly polarized mode) would remain mostly in the fiber-optic taper.

It is therefore desirable to provide apparatus and methods for enabling substantially complete transfer of an arbitrarily polarized optical signal between transversely-optically-coupled optical components. It is desirable to provide apparatus and methods for enabling substantially complete transfer of an arbitrarily polarized optical signal between a waveguide or resonator (including MLR waveguides and resonators) and a fiber-optic taper transversely-optically-coupled thereto. It is desirable to provide apparatus and methods for enabling substantially complete transfer of an arbitrarily polarized optical signal out of a fiber-optic taper and into one or more waveguides and/or resonators (including MLR waveguides and resonators) transversely-optically-coupled thereto.

SUMMARY

Certain aspects of the present invention may overcome one or more aforementioned problems with the previous art and/or advance the state-of-the-art of transversely-optically-coupled optical components, and in addition may meet one or more of the following objects:

To provide apparatus and methods for enabling substantially complete transfer of an arbitrarily polarized optical signal between transversely-optically-coupled optical components;

To provide apparatus and methods for enabling substantially complete transfer of an arbitrarily polarized optical signal between a fiber-optic taper and a waveguide or resonator (including MLR waveguides and resonators) transversely-optically-coupled thereto; and To provide apparatus and methods for enabling substantially complete transfer of an arbitrarily polarized optical signal out of a fiber-optic taper and into one or more waveguides and/or resonators (including MLR waveguides and resonators) transversely-optically-coupled thereto.

One or more of the foregoing objects may be achieved in the present invention by a method for transverse-optical coupling, comprising the steps of: a) receiving an optical signal into orthogonal linearly polarized modes of a transmission optical waveguide, the transmission waveguide including first and second transverse-coupling segments thereof; b) substantially completely transferring optical signal polarized along one polarization direction from the transmission waveguide into a first transverse-coupled waveguide, the first transverse-coupled waveguide being optically transverse-coupled to the first transverse-coupling segment of the transmission waveguide; and c) substantially completely transferring optical signal polarized along the other polarization direction from the transmission waveguide into a second transverse-coupled waveguide, the second transverse-coupled waveguide being optically transverse-coupled to the second transverse-coupling segment of the transmission waveguide. The optical signals carried by the first and second transverse-coupled waveguides may be combined into a single waveguide. The polarization directions of the transmission waveguide may be rotated about 90° between the first and second transverse-coupling segments.

One or more of the foregoing objects may be achieved in the present invention by an apparatus for transverse-optical coupling, comprising: a) a transmission optical waveguide adapted for receiving an optical signal into orthogonal linearly polarized optical modes thereof, the transmission optical waveguide including first and second transverse-coupling segments thereof; b) a first transverse-coupled optical waveguide, the first transverse-coupled waveguide being optically transverse-coupled to the first transverse-coupling segment of the transmission waveguide and adapted for substantially completely transferring optical signal polarized along one polarization direction from the transmission waveguide into the first transverse-coupled waveguide; and c) a second transverse-coupled optical waveguide, the second transverse-coupled waveguide being optically transverse-coupled to the second transverse-coupling segment of the transmission waveguide and adapted for substantially completely transferring optical signal polarized along the other polarization direction from the transmission waveguide into the second transverse-coupled waveguide. The apparatus may further include a receiving optical waveguide for receiving the combined optical signals from the first and second transverse-coupled waveguides. The transmission waveguide may be adapted to rotate the polarizations directions about 90° between the first and second transverse-coupling segments.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

FIG. 1 is a top view of an exemplary embodiment of the present invention.

FIG. 2 is a top view of an exemplary embodiment of the present invention.

FIG. 7 is an isometric view of an exemplary embodiment of the present invention.

FIG. 8 is a top view of an exemplary embodiment of the present invention.

FIG. 9 is a top view of an exemplary embodiment of the present invention.

FIG. 10 is a top view of an exemplary embodiment of the present invention.

FIG. 11 is a top view of an exemplary embodiment of the present invention.

FIG. 12 is a top view of an exemplary embodiment of the present invention.

FIG. 13 is a top view of an exemplary embodiment of the present invention.

FIG. 14 is a top view of an exemplary embodiment of the present invention.

FIG. 15 is a top view of an exemplary embodiment of the present invention.

FIG. 16 is a top view of an exemplary embodiment of the present invention.

FIG. 17 is a top view of an exemplary embodiment of the present invention.

FIGS. 18A and 18B are isometric views of exemplary embodiments of the present invention.

Figure 3:
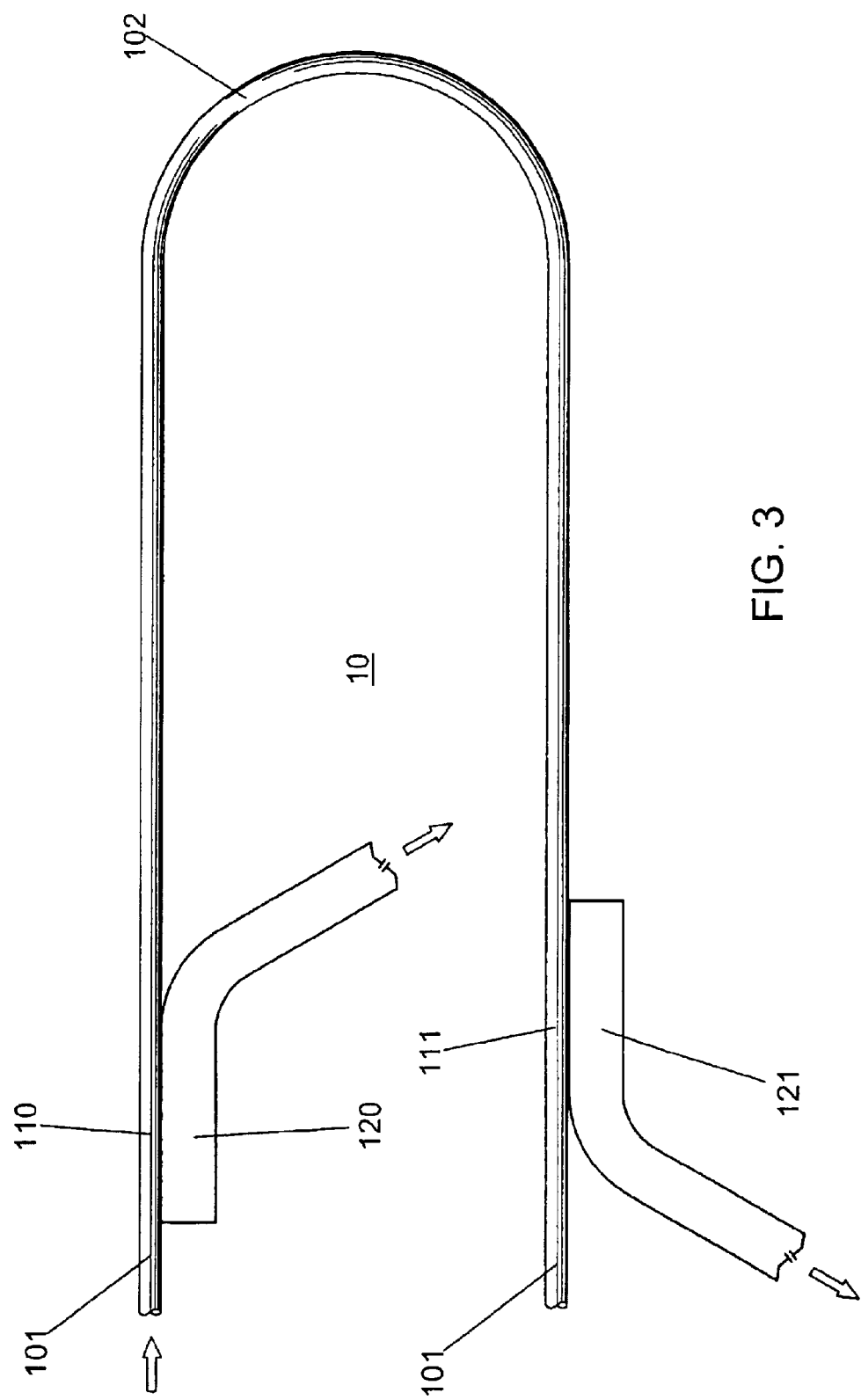
FIG. 3 is a top view of an exemplary embodiment of the present invention.

It should be noted that the relative proportions of various structures shown in the Figures may be distorted to more clearly illustrate the present invention. Relative dimensions of various devices, waveguides, resonators, optical fibers/tapers, and so forth may be distorted, both relative to each other as well as in their transverse and/or longitudinal proportions.

DETAILED DESCRIPTION OF PREFERRED AND ALTERNATIVE EMBODIMENTS

An optical signal propagating in a single-mode optical fiber that is not polarization-maintaining (which includes the majority of optical fiber used for fiber-optic telecommunications) will typically arrive at the destination end of the fiber in an arbitrary polarization state. This will generally be an elliptically polarized state having an arbitrary axis orientation and ellipticity (linear and circular polarization being special cases of elliptical polarization). The precise nature of the polarization state at any given reception point generally may not be known, since any optical signal arriving may have originated at any of numerous origination points and traversed a fiber-optic communications network by any of numerous possible pathways therethrough. Transfer of the optical signal from the optical fiber to another optical component by transverse optical coupling may therefore leave a fraction of the optical signal power in the optical fiber (corresponding to one of two substantially orthogonally linearly polarized portions of the optical signal), since substantially orthogonal TE and TM optical modes of the optical component generally cannot be modal-index-matched to the optical fiber simultaneously. Furthermore, transferring portions the optical signal power into both TE and TM modes (with differing modal indices) of the optical component may degrade the performance of the optical component and/or a device coupled thereto. (There may be circumstance wherein this is acceptable, however, as described hereinbelow.)

Apparatus and methods according to the present invention may be implemented through a variety of embodiments based on the number of transversely-optically-coupled optical components coupled to the optical fiber, the number of distinct transverse-coupling fiber-optic-taper segments provided on the optical fiber, relative positioning of fiber-optic taper segments and transversely-optically-coupled component(s), and/or the type and/or structure of optical fiber employed to form the fiber-optic taper. A common object of these embodiments is substantially complete transfer of optical signal power out of the optical fiber, regardless of the polarization state of the optical signal.

The term "optical waveguide" (or equivalently, "waveguide") as employed herein shall denote a structure adapted for supporting one or more propagating optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may vary along the length of a curvilinear waveguide, for example. Examples of optical waveguides may include, without being limited to, various types of optical fiber and optical fiber tapers, and various types of planar waveguides. The term "planar optical waveguide" (or equivalently, "planar waveguide") as employed herein shall denote any optical waveguide that is provided on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Examples of such waveguides include ridge waveguides, buried waveguides, semiconductor waveguides, other high-index waveguides ("high-index" being above about 2.5), silica-based waveguides, polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, non-linear-optical (NLO) materials, and myriad other examples not explicitly set forth herein but that may nevertheless fall within the scope of the present disclosure and/or appended claims. Many suitable substrate materials may be employed, including semiconductor, crystalline, silica or silica-based, other glasses, ceramic, metal, and myriad other examples not explicitly set forth herein but that may nevertheless fall within the scope of the present disclosure and/or appended claims.

It should be pointed out the "transverse-coupling segments" of various waveguides, referred to in the present disclosure and/or recited in the appended claims, may be structurally and/or functionally defined. As an example of a structurally-defined transverse-coupling segment, an actively modal-index-matched planar waveguide may have a transverse-coupling segment defined by the presence of a control electrode thereon. As an example of a functionally-defined transverse-coupling segment, a fiber-optic taper may have a transverse-coupling segment defined by the presence of a control electrode on a planar waveguide transverse-coupled thereto.

Figure 19:
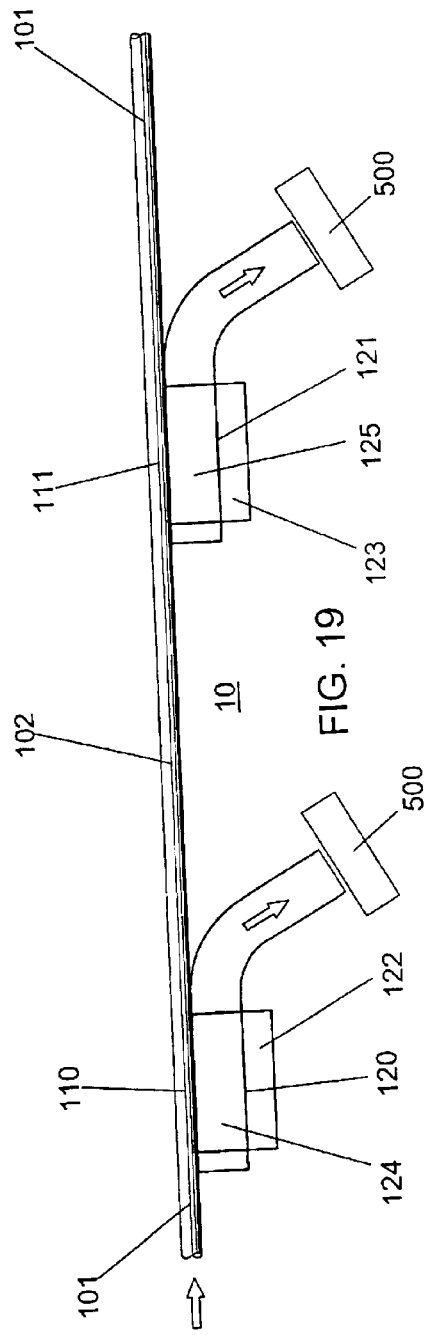
FIG. 19 is a top view of an exemplary embodiment of the present invention.
Figure 20:
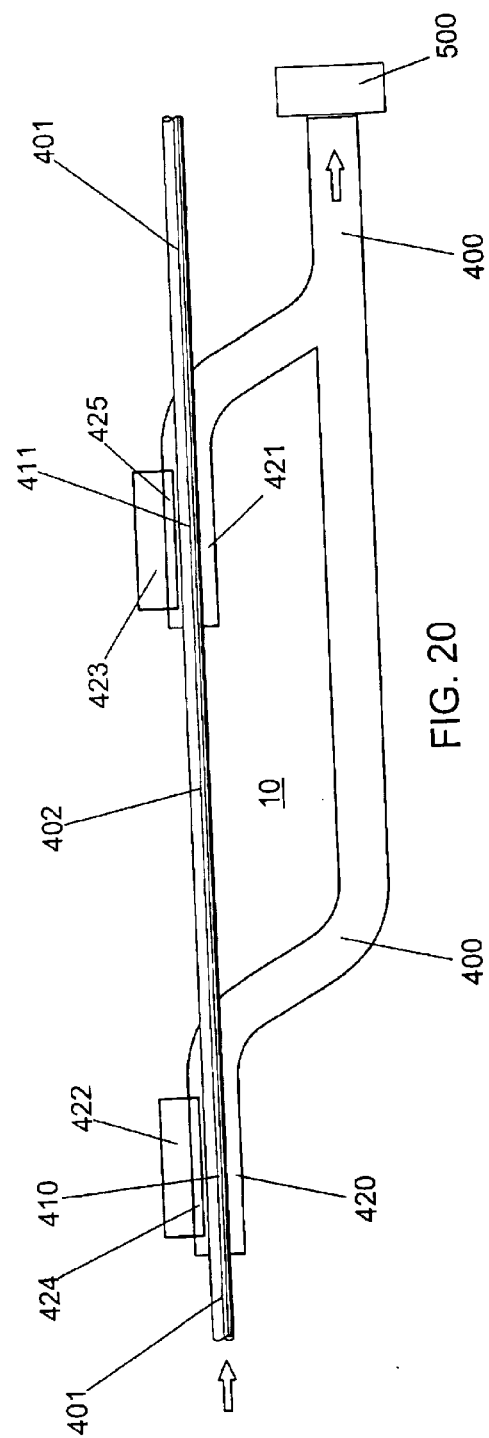
FIG. 20 is a top view of an exemplary embodiment of the present invention.

Single fiber into two waveguides In a first group of embodiments according to the present invention, an optical signal carried in an arbitrary polarization state by a tapered optical fiber 101 may be transferred into two separate transversely-optically-coupled components. In the exemplary embodiment of FIG. 18A (details and variants shown in FIGS. 1–9 and 19), planar waveguides 120 and 121 are fabricated on a substrate 10; other optical components may be equivalently employed while remaining within the scope of inventive concepts disclosed herein. A first waveguide 120 may be transversely-optically coupled to the optical fiber at a first fiber-optic-taper segment 110 and a second waveguide 121 may be coupled to the optical fiber at a second fiber-optic taper segment 111. Transverse optical coupling at the first fiber-optic taper segment may be engineered (by appropriate transverse modal overlap κ, interacting propagation length L, and modal index matching) to achieve substantially complete transfer of optical signal power carried by one of two orthogonal linearly polarized optical modes of optical fiber from the first fiber-optic taper segment into the first waveguide. Transverse optical coupling at the second fiber-optic taper segment may be engineered (by appropriate transverse modal overlap κ, interacting propagation length L, and modal index matching) to achieve substantially complete transfer of optical signal power carried by the other of the two orthogonal linearly polarized optical modes of the optical fiber from the second fiber-optic taper segment into the second waveguide. In a simple implementation of such a two-waveguide embodiment, each of the two waveguides may terminate in a photodetector 500 for detecting the optical signal (as in the exemplary embodiment of FIG. 19). The signals from the two photodetectors may be combined electronically (adding photocurrents or photovoltages), yielding optical signal detection that is independent of the polarization state of the optical signal.

This group of embodiments (single fiber to two waveguides; 1F/2WG) may be further grouped according to the morphology/methodology employed for independently engineering the transverse-optical coupling in a polarization dependent way at the two waveguides. Such polarization engineering may be achieved by manipulating the relative position/geometry of each fiber-optic-taper segment/waveguide pair, by manipulating the geometry of the fiber-optic-taper segments, and/or by manipulating the modal index matching between each fiber-optic-taper segment/waveguide pair.

Modal index matching In this case transverse-coupling fiber-optic-taper segments 110/111 of an optical fiber 101 may be positioned relative to respective waveguides 120/121 in substantially similar ways (examples: both side-coupled as in FIG. 1 or both surface-coupled as in FIG. 2). The waveguides themselves may be substantially identical (often the case when fabricated on a common substrate), though this need not always be the case. Modal index matching of the waveguides 120/121 to the taper segments 110/111 may be achieved through sufficiently accurate design and fabrication of the waveguides (passive modal-index-matching; not shown) and/or through application of control bias voltages to the waveguides to exploit the electro-optic properties of the waveguides (as shown in FIGS. 1 and 2, via electrodes or contacts 122/123/124/125). Waveguide 120 may be designed and/or biased to achieve modal index matching between one linearly polarized waveguide optical mode (a TE mode, for example) and the corresponding linearly polarized optical mode of the fiber-optic-taper segment 110 (corresponding here meaning the fiber-optic-taper mode polarized substantially parallel to the waveguide mode). With properly engineered transverse modal overlap and interaction length, substantially complete transfer of optical signal power from the polarized fiber-optic-taper mode to the TE mode of waveguide 120 may be achieved. In a similar way, waveguide 121 may be designed and/or biased to achieve modal index matching between the other linearly polarized fiber-optic-taper mode of fiber-optic-taper 111 and the other linearly-polarized waveguide mode (TM mode in this example) of waveguide 121. With properly engineered transverse modal overlap and interaction length, substantially complete transfer of optical signal power from the polarized fiber-optic-taper mode to the TM mode of the second waveguide. The net result is substantially complete transfer of optical signal power from the optical fiber 101 into the two waveguides 120/121.

The two fiber-optic taper segments 110/111 transversely optically coupled to the respective waveguides 120/121 may comprise distinct segments 110/111 of a single fiber-optic taper with an intermediate segment 102 therebetween (substantially as shown in the Figures), or alternatively may comprise two distinct fiber-optic taper segments 110/111 of an optical fiber with a segment 102 of normal-diameter (i.e., "non-pulled") optical fiber therebetween (not shown). In either case, the two fiber-optic-taper segments 110/111 may be arranged in an end-to-end configuration (along with the corresponding transversely-optically-coupled segments of the respective waveguides; FIGS. 1 and 2), or the intermediate optical fiber segment 102 (tapered or normal-diameter) may be bent, curved, wrapped, or otherwise arranged (along with the corresponding transversely-optically-coupled segments of the respective waveguides) to reduce the overall size of a device. One useful configuration may include a U-shaped bend of the intermediate fiber segment 102 (tapered or normal-diameter) with the transversely-optically-coupled waveguides 120/121 arranged substantially parallel on the substrate (FIG. 3, which also shows passive modal-index-matched side-coupling). Any suitable arrangement and/or geometry may be employed while remaining within the scope of inventive concepts disclosed herein.

Figure 4:
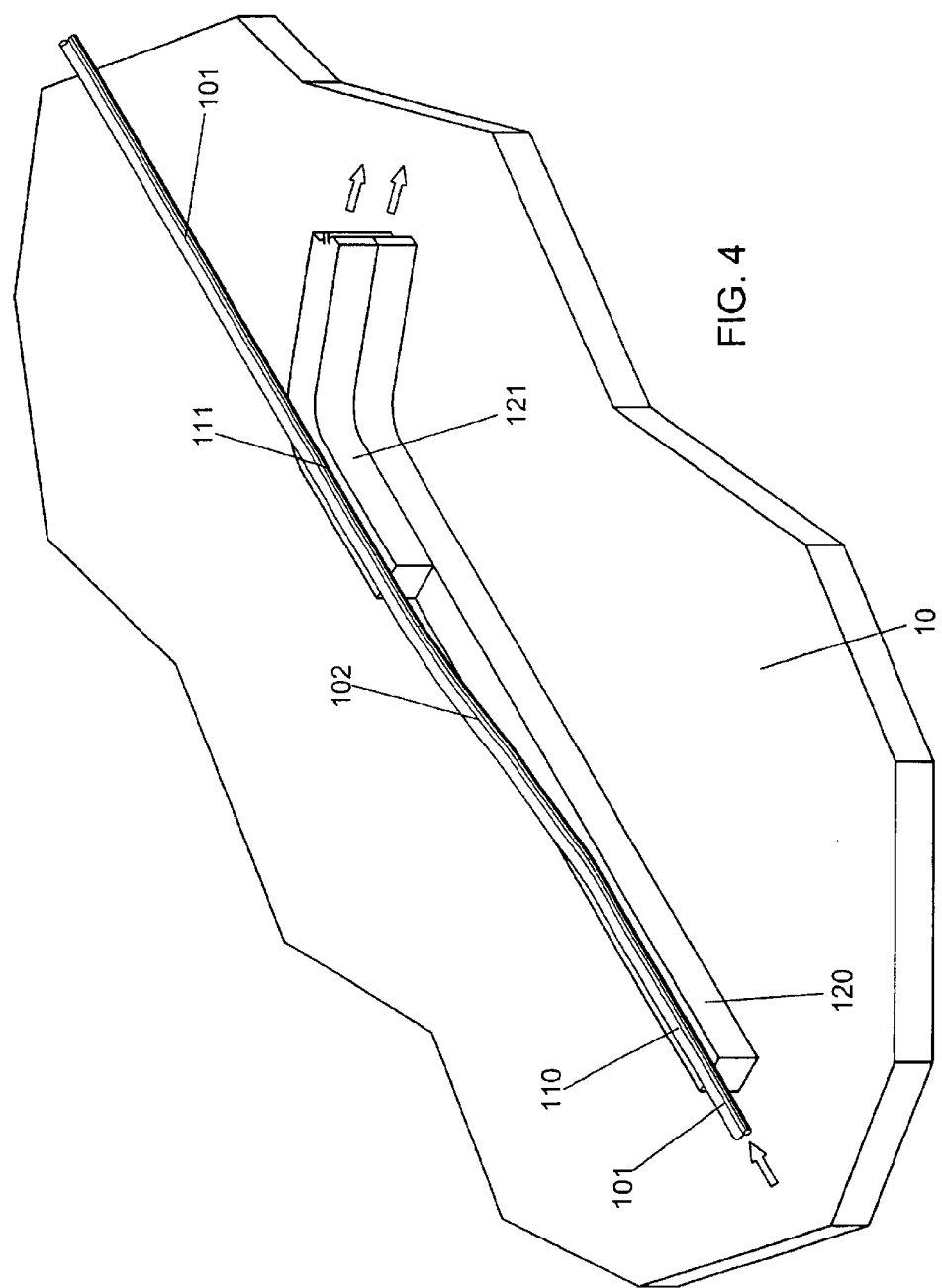
FIG. 4 is an isometric view of an exemplary embodiment of the present invention.

In another embodiment, two waveguides 120/121 may be fabricated one on top of the other on a substrate (FIG. 4). The waveguides 120/121 may be substantially similar or may substantially differ. The lower waveguide 120 may extend farther along the propagation direction than the upper waveguide 121 at one end. Waveguide 110 may be designed and/or biased to achieve modal index matching between the optical mode of the taper and a linearly polarized waveguide optical mode (passive modal-index-matched to a TM mode in this example) at the protruding segment of the waveguide 120, while waveguide 121 may be designed and/or biased to achieve modal-index-matching between the optical mode of the taper and the other linearly polarized waveguide optical mode (passive modal-index-matching to a TE mode in this example). The fiber-optic taper 101 may be surface coupled at transverse-coupling segment 110 to the protruding segment of the lower waveguide 120, and curve upward and over the leading edge of the upper waveguide 121 for surface coupling therewith at transverse-coupling segment 111. With proper engineering of the transverse modal overlaps and interaction lengths, optical signal power may be substantially completely transferred from the fiber-optic taper 101 into the stacked waveguides 120/121.

The optical fiber 101 having the two fiber-optic-taper segments 110/111 may be polarization-maintaining (PM) optical fiber or non-polarization-maintaining single-mode (SM) optical fiber. If PM optical fiber is employed, then it must be rotationally aligned along a longitudinal axis so that at any segment where the PM fiber-optic taper is transversely-optical coupled to a waveguide, the two orthogonal linear polarization directions of the PM fiber substantially correspond to the orthogonal polarization directions of the TE and TM modes of the waveguides. Fiber-optic tapers formed using SM optical fiber may be employed, as long as the length of intermediate segment 102 between the two transversely-optically-coupled fiber-optic taper segments 110/111 is substantially shorter than the distance over which the orthogonal linear polarizations become scrambled in the SM optical fiber. Whichever type of fiber is employed for implementing a transverse optical coupler according to the present invention, the fiber may be spliced, coupled, or otherwise connected to an optical fiber communications system for use.

Figure 5:
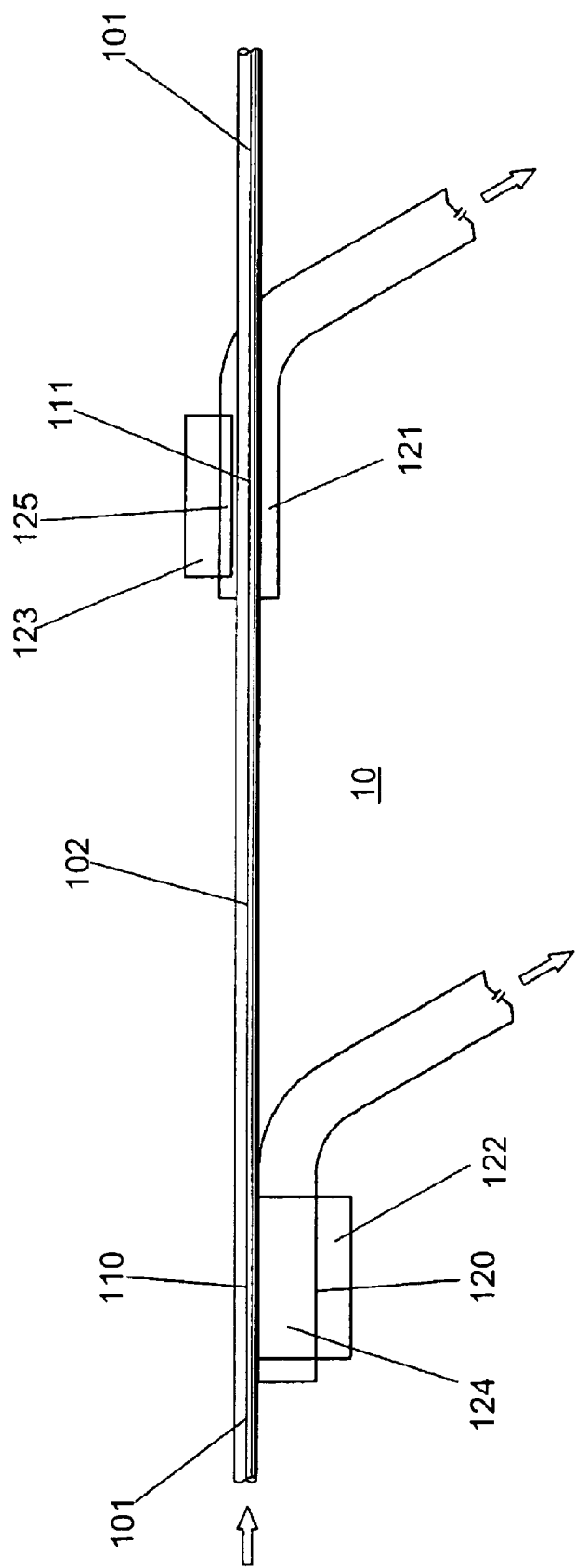
FIG. 5 is a top view of an exemplary embodiment of the present invention.
Figure 6:
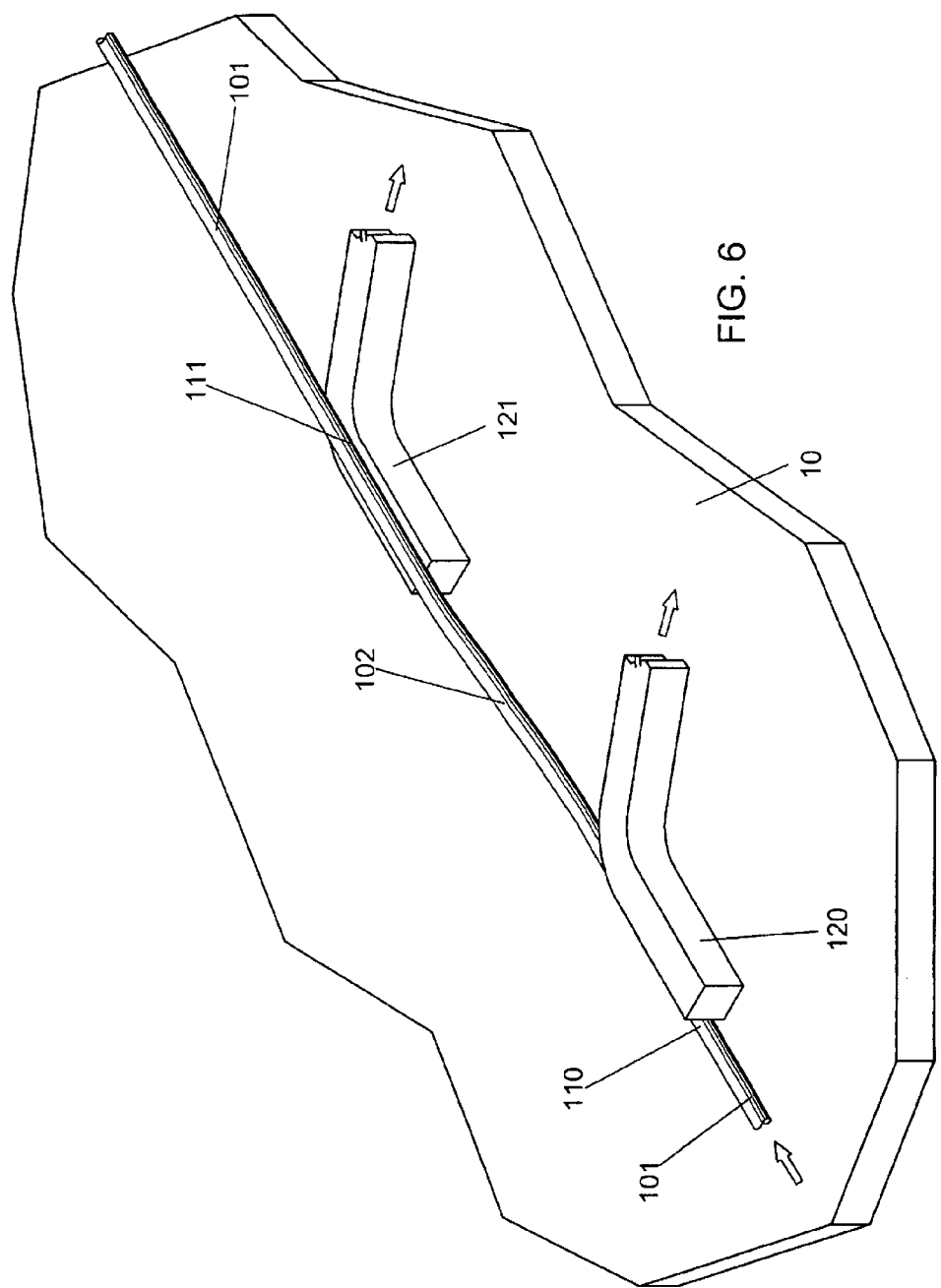
FIG. 6 is an isometric view of an exemplary embodiment of the present invention.

Taper/waveguide geometry In these embodiments each fiber-optic-taper segment 110/111 may be positioned relative to the respective waveguide 120/121 in differing ways (for example, one surface coupled and one side coupled; FIGS. 5–7). The waveguides themselves may be substantially identical (often the case when fabricated on a common substrate), though this need not always be the case. Modal index matching of the waveguides 120/121 to the respective taper segments 110/111 may be achieved through sufficiently accurate design and fabrication of the waveguides (passive modal-index-matching; FIGS. 6 and 7) and/or through application of control bias voltages to the waveguides to exploit the electro-optic properties of the waveguides (active modal-index-matching; FIG. 5). Waveguide 120 may be designed and/or biased to achieve modal index matching between one linearly polarized waveguide optical mode (a TE mode, for example) and the corresponding linearly polarized optical mode of side-coupled fiber-optic-taper segment 110. With properly engineered transverse modal overlap and interaction length, substantially complete transfer of optical signal power from the polarized fiber-optic-taper mode to the TE mode of waveguide 120 may be achieved. In a similar way, waveguide 121 may be designed and/or biased to achieve modal index matching between the other linearly-polarized waveguide mode (a TM mode in this example) and the other linearly polarized optical mode of surface-coupled fiber-optic-taper segment 111. With properly engineered transverse modal overlap and interaction length, substantially complete transfer of optical signal power from the polarized fiber-optic-taper mode to the TM mode of waveguide 121 may be achieved. In the configuration of FIG. 6, the waveguides 120/121 and the optical fiber 101 may be positioned so that the first fiber-optic taper 110 is side-coupled to the first waveguide 120. Intermediate segment 102 may then curve upward sufficiently so that the second fiber-optic taper segment 111 may be surface-coupled to the second waveguide 121. The net result is substantially complete transfer of optical signal power from the optical fiber 101 into the two waveguides 120/121.

In the configuration of FIG. 7, two substantially parallel waveguides 120/121 may be fabricated on a single substrate with waveguide 120 higher than waveguide 121 and laterally offset therefrom. The differing heights enable the optical fiber 101 to follow a substantially straight path. The waveguides may be substantially similar or may substantially differ. Waveguide 120 may be designed and/or biased to achieve modal index matching between one linearly polarized waveguide optical mode (a TM mode, for example) and the corresponding linearly polarized optical mode of side-coupled fiber-optic-taper segment 110. Waveguide 121 may be designed and/or biased to achieve modal index matching between the other linearly-polarized waveguide mode (a TE mode in this example) and the other linearly polarized optical mode of surface-coupled fiber-optic-taper segment 111. With proper engineering of the transverse modal overlaps and interaction lengths, optical signal power may be substantially completely transferred from optical fiber 101 into waveguides 120/121.

In a manner similar to that described above, the fiber-optic-taper segments may comprise distinct fiber-optic-taper segments 110/111 of a common fiber-optic taper with an intervening segment 102 of the fiber-optic taper (substantially as shown in the FIGS.), or alternatively may comprise separate fiber-optic taper segments 110/111 with an intervening segment 102 of normal-diameter fiber (not shown). The intermediate segment 102 (taper or normal-diameter) may be straight, bent, curved, wrapped, or otherwise configured, along with the waveguides, to reduce the overall size of a device. Likewise, either PM or SM optical fiber may be employed for forming the first and second fiber-optic-taper segments, and the optical fiber may be spliced, coupled, or otherwise connected to an optical fiber communications system. The ordering of the waveguides (surface-coupled first, or side-coupled first) does not substantially affect the operation of the embodiments of FIGS. 5–7.

Taper segment geometry In this case the two fiber-optic-taper segments 210/211 may be transversely-optically coupled to respective waveguides 220/221 in substantially similar relative geometries (for example, both surface coupled with passive modal-index-matching in FIG. 8, or both side coupled with active modal-index-matching by electrodes 222/224/223/225 in FIG. 9). The waveguides 220/221 may be substantially similar or may substantially differ. The fiber-optic-taper segments 210/211 are preferably formed from PM optical fiber 201. The intermediate segment 202 of the optical fiber (i.e., between the two transversely-optically-coupled fiber-taper segments 210/211) is twisted about 90° and the optical fiber rotationally aligned about a longitudinal axis so that one polarization direction of the optical fiber 201 in the first fiber-optic taper segment 210 is substantially parallel to the polarization direction of a linearly-polarized optical mode of waveguide 220 (a TE mode, for example), while the other polarization axis of the optical fiber 201 in the second fiber-optic-taper segment 211 is substantially parallel to the polarization axis of the same linearly-polarized optical mode of waveguide 221 (also a TE mode in this example). The twist in the intermediate segment 202 of PM fiber 201 must occur over a sufficiently long distance so that the transition is substantially "adiabatic" (i.e., with negligible transfer of optical signal power between the orthogonally polarized optical modes of the PM optical fiber). The twist may preferably be made by heating a portion of the PM optical fiber 201 until it softens and then twisting it while soft. The PM optical fiber 201 may then be heated and pulled to form a single fiber-optic taper segment that includes transverse-coupling segment 210/211 and the twisted intermediate segment 202.

Alternatively, two fiber-optic taper segments 210/211 may be formed, one on each side of the twisted fiber segment 202 (normal diameter). It may be desirable to twist (with or without softening) a fiber-optic taper after it has been pulled to form intermediate twisted segment 202.

These single fiber/two waveguide embodiments may be useful in instances requiring portions of the optical signal to be routed to two different destinations within a device. A single fiber/two waveguide embodiment may be employed to transmit the entire optical signal to an intensity detector such as a photodiode, which may preferably be integrated onto the same substrate as the waveguides, or may comprise a separate component. The two waveguides may be positioned to illuminate a single detector in a side-by-side or stacked geometry (not shown). Alternatively, the two waveguides may be directed to active areas of a photodetector on opposing sides thereof (not shown). Such a configuration might be particularly well-suited for use with an integrated photodetector. In any of these devices, any mismatch in optical path traversed by each portion of the optical signal must be kept sufficiently small so as to avoid temporal distortion of data encoded on the optical signal.

Single fiber to single waveguide In a second group of embodiments according to the present invention, an optical signal carried in an arbitrary polarization state by a tapered optical fiber 301 may be substantially completely transferred into a single transversely-optically-coupled component. In the exemplary embodiment of FIG. 18B (details and variants shown in FIGS. 10–17 and 20), planar waveguide 300 (with transverse-coupling segments 320 and 321) is fabricated on a substrate 10; other optical components may be equivalently employed while remaining within the scope of inventive concepts disclosed herein. Transfer of the entire optical signal into a single waveguide eliminates the amplitude fluctuations/uncertainty associated with random division of the optical signal into two separate waveguides (due to the arbitrary polarization state of the optical signal after transmission through a fiber-optic telecommunications network).

In some applications it is important to transfer the optical signal into only one of the linearly polarized optical modes of the waveguide. In FIGS. 10 and 11, a first transverse-coupling segment 320 of branched optical waveguide 300 may be transversely optically coupled to a first fiber-optic-taper segment 310 of a polarization-maintaining (PM) optical fiber 301, while a second transverse-coupling segment 321 of the same optical waveguide 300 may be transversely optically coupled to a second fiber-optic-taper segment 311 of the PM optical fiber 301 (both active modal-index-matched side-coupled in FIG. 10; both passive modal-index-matched surface-coupled in FIG. 11). Transverse optical coupling at the first fiber-optic taper segment 310 may be engineered (by appropriate transverse modal overlap κ, interacting propagation length L, rotational alignment of the first PM fiber-optic-taper segment, and modal index matching) to achieve substantially complete transfer of optical signal power carried by one of two orthogonal linearly polarized optical modes of the PM optical fiber 301 from the first fiber-optic taper segment 310 into a linearly polarized mode (TE or TM) of the optical waveguide 300 at the first coupling segment 320. An intervening portion of the PM optical fiber 302 (an intermediate portion of a single tapered fiber segment or a normal-diameter segment between two tapered fiber segments; as described hereinabove) includes a longitudinal twist of about 90° (provided in any of the ways described hereinabove). Transverse optical coupling at the second fiber-optic taper segment 311 may be engineered (by appropriate transverse modal overlap κ, interacting propagation length L, and modal index matching) to achieve substantially complete transfer of optical signal power carried by the other of the two orthogonal linearly polarized optical modes of the optical fiber 301 (rotated by about 90° by the twist) from the second fiber-optic taper segment 311 into the same linearly polarized optical mode (TE or TM) of the optical waveguide 300 at the second coupling segment 321. Portions of optical signal power carried by the two linear polarization states of the optical fiber 301 are therefore both transferred into the same linearly polarized optical mode of the waveguide 300. The coupling geometry at each of the coupling segments may be surface-coupled, side-coupled, or other suitable transverse-optical-coupling geometry. The coupling geometry may preferably be the same for both coupling segments of the optical waveguide, or the coupling geometry may differ between the two coupling segments.

A goal of the embodiments of FIGS. 10 and 11 is substantially complete conversion of an optical signal carried by the optical fiber in an arbitrary polarization state into an optical signal carried by the optical waveguide in a single linear polarization state. Since optical signal power from the two orthogonal linear polarization states of the optical fiber arrive at the waveguide with arbitrary relative phase, and since each traverses a different optical path before being combined in the waveguide, the relative phase of the two portions of the optical signal must be controlled and adjusted to result in constructive interference of the two portions of the optical signal when they are recombined in waveguide 300. A segment of one branch of the optical waveguide 300 is preferably provided with electrodes 332 and 334 for applying a control bias voltage. In this way the electro-optic properties of the waveguide 300 may be exploited for altering the modal index of one waveguide branch and hence the relative phase of the portions of the optical signal as they are recombined where the branches converge. The two branches come together to form a single waveguide, thereby combining the two portions of the optical signal (now carried by the same linearly polarized mode of the optical waveguide. The control voltage applied to the control electrodes 332/334 may be adjusted to yield constructive interference of the combined portions of the optical signal and maximal transmission of optical signal power through the waveguide 300. Control electrodes may be equivalently provided on a segment of the other branch of the waveguide, or on both branches.

In practice, the PM optical fiber 301 of the embodiments of FIGS. 10 and 11 may be spliced, coupled, or otherwise connected to an optical fiber communication system. An optical signal of arbitrary polarization state arriving at the device is divided into the two orthogonal linearly polarized modes of the PM optical fiber. The fraction of the optical signal power coupled into each of these modes and their relative phase are arbitrary, depending on the polarization state of the incoming optical signal. However, the devices shown in FIGS. 10 and 11 enable substantially complete transfer of the optical signal carried by both linearly polarized modes of the PM optical fiber into a single linearly polarized mode of the waveguide, without amplitude variations resulting from polarization-state variations.

A further application of a device according to the present invention enables conversion of an arbitrarily polarized optical signal carried by an optical fiber to be substantially completely converted to a linearly polarized optical signal carried by the optical fiber. In the embodiments shown in FIGS. 12 and 13, a branched waveguide 300 with two coupling segments 320/321 and control electrodes 332/334 is again employed, along with a twisted PM fiber-optic taper 301. As in the previous embodiment, the entire optical signal is transferred from an arbitrarily polarized mode in the optical fiber 301 into a linearly polarized mode in the waveguide 300. A third transverse-coupling region 340 is provided on the waveguide 300 and transversely optically coupled to an optical fiber (shown as the same fiber 301 that carried the incoming optical signal, but could equivalently comprise a separate output optical fiber; passive modal-index-matched side-coupling shown in FIG. 12; active modal-index-matched surface-coupling shown in FIG. 13). The output optical fiber preferably comprises PM optical fiber rotationally aligned with the polarization direction of the waveguide coupling segment 340. The output optical fiber could alternatively comprise non-PM single mode optical fiber if the optical signal does not propagate through the output fiber far enough to lose its linear polarization. This "polarization de-scrambler" embodiment may find particular utility in facilitating the use of resonant optical power control devices, including resonant optical modulators and filters, N×N optical switches, and so on, in which one or more of various polarization-dependent optical components may be transversely optically coupled to a fiber-optic taper for manipulating a received optical signal propagating therethrough.

There may be instances when transferring optical signal power from the optical fiber into both TE and TM optical modes of an optical component may be acceptable. For example, if the objective were to simply transfer substantially all of the optical signal power from the optical fiber into a waveguide and thence to a non-polarization-dependent detector (as in the exemplary embodiment of FIG. 20; perhaps integrated with the waveguide), then differing TE and TM modal indices should not pose a problem, provided that the waveguide-to-detector distance is sufficiently short (dependent on the degree of TE/TM modal-group-delay-mismatch relative to the data rate of the optical signal). A simple implementation of the present invention may therefore include a transmission optical fiber having a fiber-optic taper segment 401 and a waveguide 400 having two independent electro-optic transverse-optical-coupling segments 420/421 thereof (FIGS. 14–17). The fiber-optic taper segment 401 may be positioned along the waveguide and be side coupled (FIGS. 14 and 16), surface coupled (FIGS. 15 and 17), or otherwise transversely-optically coupled to both electro-optic transverse-optical-coupling segments 420/421 of the waveguide 400. Waveguide 400 may be branched (FIGS. 14 and 15) or unbranched (FIGS. 16–17). An appropriate control bias voltage may be applied to the first transverse-optical-coupling segment 420 via electrodes 422/424 to achieve modal-index-matching between one linearly-polarized waveguide mode (TE for example) and a mode of the fiber-optic taper 401. With properly engineered transverse modal overlap and interaction length, substantially complete transfer of optical signal power from the linearly-polarized fiber-optic-taper mode to the TE mode of waveguide segment 420 may be achieved. Modal-index-mismatch for the fiber-optic taper and the TM waveguide mode would result in little or negligible transfer of optical power from the second polarized optical signal portion of the fiber-optic taper 401 into the TM mode of waveguide segment 420. An appropriate control bias voltage may be applied to the second transverse-optical-coupling segment 421 via electrodes 423/425 to achieve modal-index-matching between the second linearly-polarized waveguide mode (TM for this example) and the fiber-optic taper 401. With properly engineered transverse modal overlap and interaction length, substantially complete transfer of optical signal power from the second polarized fiber-optic-taper mode to the TM mode of waveguide segment 421 may be achieved. Modal-index-mismatch for the fiber-optic taper and the TE waveguide mode would result in little or negligible transfer of optical power from the TE waveguide mode back into the fiber-optic taper 401 from segment 421. Substantially all of the optical signal power is therefore transferred into the waveguide 400, divided arbitrarily between TE and TM optical modes thereof. To the extent that the differing modal indices or differing modal group velocities of TE and TM optical modes do not adversely affect the performance of the waveguide or other components coupled thereto, this embodiment provides efficient polarization-independent transfer of optical signal power from the optical fiber to a transversely-optically-coupled device. The embodiments of FIGS. 14–17 may be implemented with a SM fiber-optic taper, or with a PM fiber-optic taper with its polarization axes rotationally aligned with the polarization axes of the TE and TM waveguide modes.

In another embodiment in which optical signal power is substantially completely transferred from a fiber-optic taper to both TE and TM modes of a waveguide, polarization-maintaining (PM) optical fiber is employed and provided with a fiber-optic-taper segment for transverse optical coupling. A waveguide is designed having a TE modal index substantially matching a modal index of a first of the substantially orthogonally linearly polarized optical modes supported by the PM fiber-optic taper segment, while simultaneously having a TM modal index substantially matching a modal index of a second of the substantially orthogonally polarized optical modes (substantially orthogonal to the first) supported by the PM fiber-optic-taper segment. This simultaneous modal-index-matching may be achieved by appropriate design and construction of the waveguide without applied control signals (passive modal-index-matching), or may be achieved by application of a control voltage to an properly designed and constructed electro-optic waveguide (active modal-index-matching). With properly engineered transverse modal overlap and interaction length, substantially complete transfer of optical signal power from the polarized fiber-optic-taper modes to the TE and TM modes of the waveguide may be achieved. To the extent that the differing modal group velocities of TE and TM optical modes do not adversely affect the performance of the waveguide or other components coupled thereto, this embodiment provides efficient polarization-independent transfer of optical signal power from the optical fiber to a transversely-optically-coupled device. The difficulty lies in designing the waveguide with TE and TM modal indices that simultaneously substantially match modal indices of orthogonally polarized fiber-optic taper modes. Some experimentation will be required to determine a suitable waveguide dimensions and configuration for a given waveguide material or set of materials.

In an alternative to the embodiment disclosed in the preceding paragraph, a similar embodiment could be constructed employing a single-mode (non-PM) fiber-optic-taper. The waveguide is preferably designed so that TE and TM modes have substantially matched modal indices (perhaps over a range of design wavelengths). Such an embodiment would provide substantially complete transfer of optical signal power from the fiber-optic taper to the TE and TM modes of the waveguide. To the extent that potentially differing modal group velocities of TE and TM optical modes do not adversely affect the performance of the waveguide or other components coupled thereto, this embodiment provides efficient polarization-independent transfer of optical signal power from the optical fiber to a transversely-optically-coupled device.

The present invention has been set forth in the forms of its preferred and alternative embodiments. It is nevertheless intended that modifications to the disclosed apparatus and methods for polarization-engineered transverse optical coupling apparatus and methods may be made without departing from inventive concepts disclosed and/or claimed herein.

What is claimed is:

1. An optical apparatus, comprising:
a transmission optical waveguide for receiving an optical signal, the transmission optical waveguide supporting transmission waveguide optical modes linearly polarized alone substantially perpendicular first and second transmission waveguide polarization directions, the optical signal being carried by the transmission waveguide optical modes, the transmission optical waveguide including first and second transverse-coupling segments thereof;
a first transverse-coupled optical waveguide including a transverse-coupling segment thereof, the transverse-coupling segment of the first transverse-coupled optical waveguide being transverse-coupled to the first transverse-coupling segment of the transmission optical waveguide, the transverse-coupling segment of the first transverse-coupled optical waveguide being adapted for substantially complete substantially modal-index-matched transfer of a first portion of the optical signal from the transmission optical waveguide into the first transverse-coupled optical waveguide, the first portion of the optical signal being that portion carried by the transmission waveguide optical mode polarized along the first polarization direction; and
a second transverse-coupled optical waveguide including a transverse-coupling segment thereof, the transverse-coupling segment of the second transverse-coupled optical waveguide being transverse-coupled to the second transverse-coupling segment of the transmission optical waveguide, the transverse-coupling segment of the second transverse-coupled optical waveguide being adapted for substantially complete substantially modal-index-matched transfer of a second portion of the optical signal from the transmission optical waveguide into the second transverse-coupled optical waveguide, the second portion of the optical signal being that portion carried by the transmission waveguide optical mode polarized along the second polarization direction,
the transmission optical waveguide comprising an optical fiber, the first transverse-coupling segment of the transmission optical waveguide comprising a portion of a fiber-optic taper segment of the optical fiber, the second transverse-coupling segment of the transmission optical waveguide comprising a portion of a fiber-optic taper segment of the optical fiber.

2. The apparatus of claim 1, the first and the second transverse-coupling segments of the transmission optical waveguide each being a portion of a common fiber-optic taper segment of the optical fiber.

3. The apparatus of claim 1, the first transverse-coupling segment of the transmission optical waveguide being a portion of a first fiber-optic taper segment of the optical fiber, the second transverse-coupling segment of the transmission optical waveguide being a portion of a second fiber-optic taper segment of the optical fiber.

4. The apparatus of claim 1, the optical fiber being single-mode optical fiber.

5. The apparatus of claim 1, the optical fiber being polarization-maintaining optical fiber, the first and second transmission waveguide polarization directions substantially corresponding to polarization directions defined by the polarization-maintaining fiber.

6. The apparatus of claim 5, the optical fiber including a twisted portion between the first and the second transverse-coupling segments, the first and the second transmission waveguide polarization directions being thereby rotated by about 90° between the first and the second transverse-coupling segments of the transmission optical waveguide.

7. The apparatus of claim 5, the optical fiber including a curved portion between the first and the second transverse-coupling segments, the first and the second transverse-coupling segments being thereby arranged side-by-side with substantially anti-parallel propagation directions.

8. The apparatus of claim 1, the first transverse-coupled optical waveguide comprising a first planar waveguide, the second transverse-coupled optical waveguide comprising a second planar waveguide.

9. The apparatus of claim 8, the first and the second planar waveguides being formed on a common waveguide substrate.

10. The apparatus of claim 8, the first planar waveguide or the second planar waveguide being a multi-layer-reflector waveguide.

11. The apparatus of claim 8, the first planar waveguide or the second planar waveguide including electro-optic material.

12. The apparatus of claim 11, the transverse-coupling segment of the first planar waveguide or the second planar waveguides including at least one control electrode for applying a control signal to the electro-optic material, thereby enabling control of a modal index of the transverse-coupling segment of the first planar waveguide or the second waveguide.

13. The apparatus of claim 8, the transverse-coupling segment of the first planar waveguide or the second planar waveguide being adapted for active substantially modal-index-matched transverse-coupling with the corresponding transverse-coupling segment of the transmission optical waveguide.

14. The apparatus of claim 8, the transverse-coupling segment of the first planar waveguide or the second planar waveguide being adapted for passive substantially modal-index-matched transverse-coupling with the corresponding transverse-coupling segment of the transmission optical waveguide.

15. The apparatus of claim 8, the transverse-coupling segment of the first planar waveguide or the second planar waveguides being surface-coupled to the corresponding transverse-coupling segment of the optical fiber.

16. The apparatus of claim 8, the transverse-coupling segment of the first planar waveguide or the second planar waveguides being side-coupled to the corresponding transverse-coupling segment of the optical fiber.

17. The apparatus of claim 8, the second planar waveguide being formed on top of the first planar waveguide on a waveguide substrate, the transverse-coupling segment of the first planar waveguide being a portion of the first planar waveguide extending beyond an end of the second planar waveguide, the first and the second transverse-coupling segments of the transmission optical waveguide each being a portion of a common fiber-optic taper segment of the optical fiber, the fiber-optic taper segment being positioned on the first and the second planar waveguides so that the first transverse-coupling segment of the optical fiber is surface-coupled to the transverse-coupling segment of the first planar waveguide and the second transverse-coupling segment of the optical fiber is surface-coupled to the transverse-coupling segment of the second planar waveguide.

18. The apparatus of claim 8, the first and the second planar waveguides being formed on a common waveguide substrate, the apparatus further comprising a photodetector on the common waveguide substrate, the first and the second planar waveguides being arranged for transmitting the respective first and second portions of the optical signal from the transmission optical waveguide to the photodetector.

19. The apparatus of claim 8, the first and the second planar waveguides being formed on a common waveguide substrate, the apparatus further comprising a third planar waveguide formed on the common waveguide substrate, the first and the second planar waveguides being arranged for transmitting the respective first and second portions of the optical signal from the transmission optical waveguide into the third planar waveguide.

20. The apparatus of claim 19, the first and the second planar waveguides merging to form the third planar waveguide.

21. The apparatus of claim 19, the apparatus further comprising a photodetector on the common waveguide substrate, the third planar waveguide being arranged for transmitting the respective first and second portions of the optical signal from the first and the second planar waveguides to the photodetector.

22. The apparatus of claim 19, the optical fiber including a twisted portion between the first and the second transverse-coupling segments, the first and the second transmission waveguide polarization directions being thereby rotated by about 90° between the first and the second transverse-coupling segments of the transmission optical waveguide, the first and second portions of the optical signal being transmitted by the first and the second planar waveguides, respectively, to the third planar waveguide with substantially parallel substantially linear polarizations, the first planar waveguide and the second planar waveguide being adapted for controlling relative phase of the first and second portions of the optical signal so as to obtain substantially constructive interference thereof in the third planar waveguide and thereby form a combined optical signal.

23. The apparatus of claim 22, the third planar waveguide including a transverse-coupling segment thereof, the transverse-coupling segment of the third planar waveguide being transverse-coupled to a transverse-coupling segment of a fiber-optic taper segment of an output optical fiber, the transverse-coupling segment of the third planar waveguide being adapted for substantially complete substantially modal-index-matched transfer of the combined optical signal from the third planar waveguide to the output optical fiber.

24. The apparatus of claim 23, the transmission optical waveguide and the output optical fiber being portions of a common optical fiber.

25. The apparatus of claim 23, the output optical fiber being a second optical fiber.

26. The apparatus of claim 23, the transverse-coupling segment of the third planar waveguide being adapted for active substantially modal-index-matched transverse-coupling with the transverse-coupling segment of the output optical fiber.

27. The apparatus of claim 23, the transverse-coupling segment of the third planar waveguide being adapted for passive substantially modal-index-matched transverse-coupling with the transverse-coupling segment of the output optical fiber.

28. The apparatus of claim 8, the first and the second planar waveguides being portions of a common planar waveguide.

29. An optical method comprising:
receiving an optical signal into a transmission optical waveguide, the transmission optical waveguide supporting transmission waveguide optical modes linearly polarized along substantially perpendicular first and second transmission waveguide polarization directions, the optical signal being carried by the transmission waveguide optical modes, the transmission optical waveguide including first and second transverse-coupling segments thereof;

substantially completely transferring a first portion of the optical signal from the transmission optical waveguide into a first transverse-coupled optical waveguide, the first portion of the optical signal being that portion carried by the transmission waveguide optical mode polarized along the first polarization direction, the first transverse-coupled optical waveguide including a transverse-coupling segment thereof, the transverse-coupling segment of the first transverse-coupled optical waveguide being transverse-coupled to the first transverse-coupling segment of the transmission optical waveguide, the transverse-coupling segment of the first transverse-coupled optical waveguide being adapted for substantially complete substantially modal-index-matched transfer of an optical signal carried by the transmission waveguide optical mode polarized along the first polarization direction from the transmission optical waveguide into the first transverse-coupled optical waveguide; and substantially completely transferring a second portion of the optical signal from the transmission optical waveguide into a second transverse-coupled optical waveguide, the second portion of the optical signal being that portion carried by the transmission waveguide optical mode polarized alone the second polarization direction, the second transverse-coupled optical waveguide including a transverse-coupling segment thereof, the transverse-coupling segment of the second transverse-coupled optical waveguide being transverse-coupled to the second transverse-coupling segment of the transmission optical waveguide, the transverse-coupling segment of the second transverse-coupled optical waveguide being adapted for substantially complete substantially modal-index-matched transfer of an optical signal carried by the transmission waveguide optical mode polarized along the second polarization direction from the transmission optical waveguide into the second transverse-coupled optical waveguide, the transmission optical waveguide comprising an optical fiber, the first transverse-coupling segment of the transmission optical waveguide comprising a portion of a fiber-optic taper segment of the optical fiber, the second transverse-coupling segment of the transmission optical waveguide comprising a portion of a fiber-optic taper segment of the optical fiber.

30. The method of claim 29, the first and the second transverse-coupling segments of the transmission optical waveguide each being a portion of a common fiber-optic taper segment of the optical fiber.

31. The method of claim 29, the first transverse-coupling segment of the transmission optical waveguide being a portion of a first fiber-optic taper segment of the optical fiber, the second transverse-coupling segment of the transmission optical waveguide being a portion of a second fiber-optic taper segment of the optical fiber.

32. The method of claim 29, the optical fiber being single-mode optical fiber.

33. The method of claim 29, the optical fiber being polarization-maintaining optical fiber, the first and second transmission waveguide polarization directions substantially corresponding to polarization directions defined by the polarization-maintaining fiber.

34. The method of claim 33, the optical fiber including a twisted portion between the first and the second transverse-coupling segments, the first and the second transmission waveguide polarization directions being thereby rotated by about 90° between the first and the second transverse-coupling segments of the transmission optical waveguide.

35. The method of claim 33, the optical fiber including a curved portion between the first and the second transverse-coupling segments, the first and the second transverse-coupling segments being thereby arranged side-by-side with substantially anti-parallel propagation directions.

36. The method of claim 29, the first transverse-coupled optical waveguide comprising a first planar waveguide, the second transverse-coupled optical waveguide comprising a second planar waveguide.

37. The method of claim 36, the first and the second planar waveguides being formed on a common waveguide substrate.

38. The method of claim 36, the first planar waveguide or the second planar waveguide being a multi-layer-reflector waveguide.

39. The method of claim 36, the first planar waveguide or the second planar waveguide including electro-optic material.

40. The method of claim 39, further including applying a control signal to control a modal index of the transverse-coupling segment of the first planar waveguide or the second planar waveguide, the transverse-coupling segment of the first planar waveguide or the second planar waveguide including at least one control electrode for applying the control signal to the electro-optic material.

41. The method of claim 36, further including actively modal-index matching the transverse-coupling segment of the first planar waveguide or the second planar waveguide with the corresponding transverse-coupling segment of the transmission optical waveguide, the transverse-coupling segment of the first planar waveguide or the second planar waveguide being adapted therefor.

42. The method of claim 36, the transverse-coupling segment of the first planar waveguide or the second planar waveguide being adapted for passive modal-index-matched transverse-coupling with the corresponding transverse-coupling segment of the transmission optical waveguide.

43. The method of claim 36, the transverse-coupling segment of the first planar waveguide or the second planar waveguide being surface-coupled to the corresponding transverse-coupling segment of the optical fiber.

44. The method of claim 36, the transverse-coupling segment of the first planar waveguide or the second planar waveguide being side-coupled to the corresponding transverse-coupling segment of the optical fiber.

45. The method of claim 36, the second planar waveguide being formed on top of the first planar waveguide on a waveguide substrate, the transverse-coupling segment of the first planar waveguide being a portion of the first planar waveguide extending beyond an end of the second planar waveguide, the first and the second transverse-coupling segments of the transmission optical waveguide each being a portion of a common fiber-optic taper segment of the optical fiber, the fiber-optic taper segment being positioned on the first and the second planar waveguides so that the first transverse-coupling segment of the optical fiber is surface-coupled to the transverse-coupling segment of the first planar waveguide and the second transverse-coupling segment of the optical fiber is surface-coupled to the transverse-coupling segment of the second planar waveguide.

46. The method of claim 36, further including transmitting the respective first and second portions of the optical signal from the transmission optical waveguide through the first and the second planar waveguides to a photodetector on a common waveguide substrate, the first and the second planar waveguides being formed and arranged therefor on the common waveguide substrate.

47. The method of claim 36, further including transmitting the respective first and second portions of the optical signal from the transmission optical waveguide through the first and the second planar waveguides into a third planar waveguide, the first, the second, and the third planar waveguides being formed and arranged therefor on a common waveguide substrate.

48. The method of claim 47, the first and the second planar waveguides merging to form the third planar waveguide.

49. The method of claim 47, further including transmitting the respective first and second portions of the optical signal through the first and the second planar waveguides, through the third planar waveguide, and into a photodetector on the common waveguide substrate, the third planar waveguide being arranged therefor.

50. The method of claim 47, the optical fiber including a twisted portion between the first and the second transverse-coupling segments, the first and the second transmission waveguide polarization directions being thereby rotated by about 90° between the first and the second transverse-coupling segments of the transmission optical waveguide, the first and the second portions of the optical signal being transmitted by the first and the second planar waveguides, respectively, to the third planar waveguide with substantially parallel substantially linear polarizations, the first planar waveguide or the second planar waveguide being adapted for controlling relative phase of the first and second portions of the optical signal, the method further including controlling the relative phase so as to obtain substantially constructive interference of the first and the second portions of the optical signal in the third planar waveguide and thereby forming a combined optical signal.

51. The method of claim 50, further including substantially completely transferring the combined optical signal from the third planar waveguide to an output optical fiber, the third planar waveguide including a transverse-coupling segment thereof, the transverse-coupling segment of the third planar waveguide being transverse-coupled to a transverse-coupling segment of a fiber-optic taper segment of the output optical fiber, the transverse-coupling segment of the third planar waveguide being adapted for substantially complete substantially modal-index-matched transfer of the combined optical signal from the third planar waveguide to the output optical fiber.

52. The method of claim 51, the transmission optical waveguide and the output optical fiber being portions of a common optical fiber.

53. The method of claim 51, the output optical fiber being a second optical fiber.

54. The method of claim 51, further including actively modal-index matching the transverse-coupling segment of the third planar waveguide with the transverse-coupling segment of the output optical fiber, the transverse-coupling segment of the third planar waveguide being adapted therefor.

55. The method of claim 51, the transverse-coupling segment of the third planar waveguide being adapted for passive modal-index-matched transverse-coupling with the transverse-coupling segment of the output optical fiber.

56. The method of claim 36, the first and the second planar waveguides being portions of a common planar waveguide.

* * * * *

UNITED STATES PATENT AND TRADEMARK OFFICE
CERTIFICATE OF CORRECTION

PATENT NO. : 6,907,169 B2
APPLICATION NO. : 10/284041
DATED : June 14, 2005
INVENTOR(S) : Vahala et al.

It is certified that error appears in the above-identified patent and that said Letters Patent is hereby corrected as shown below:

On the Title Page

Items (56) References Cited
Other Publications, pg. 2, Column 1,
4th Reference

Delete "andM. J. Ries",
Insert --and M. J. Ries--

Item (56) References Cited
Other Publications, pg. 2, Column 1,
6th Reference

Delete "R. H. Homg",
Insert --R. H. Horng--

Item (56) References Cited
Other Publications, pg. 2, Column 2,
2nd Reference

Delete "MacDougalP .D.",
Insert --MacDougal, P. D.--

Item (56) References Cited
Other Publications, pg. 2, Column 2,
5th Reference

Delete "vertical-Cavity",
Insert --vertical-cavity--

Item (56) References Cited
Other Publications, pg. 2, Column 2,
7th Reference

Delete "dielctric",
Insert --dielectric--

Item (56) References Cited
Other Publications, pg. 2, Column 2,
10th Reference

Delete "F. tong,",
Insert --F. Tong--

Item (56) References Cited
Other Publications, pg. 3, Column 2,
3rd Reference

Delete "Z-F. Xiao",
Insert --Z.-F. Xiao--

UNITED STATES PATENT AND TRADEMARK OFFICE
CERTIFICATE OF CORRECTION

PATENT NO. : 6,907,169 B2
APPLICATION NO. : 10/284041
DATED : June 14, 2005
INVENTOR(S) : Vahala et al.

It is certified that error appears in the above-identified patent and that said Letters Patent is hereby corrected as shown below:

In the Claims

| | |
|---|---|
| Column 15, line 15, Claim 1 | Delete "alone", Insert --along-- |
| Column 16, line 29, Claim 12 | Delete "waveguides", Insert --waveguide-- |
| Column 16, line 33, Claim 12 | Before "waveguide", Insert --planar-- |
| Column 16, line 48, Claim 15 | Delete "waveguides", Insert --waveguide-- |
| Column 16, line 52, Claim 16 | Delete "waveguides", Insert --waveguide-- |
| Column 17, line 34, Claim 22 | Delete "and the second", Insert --or the second-- |
| Column 18, line 30, Claim 29 | Delete "alone", Insert --along-- |

Signed and Sealed this

Fifth Day of September, 2006

JON W. DUDAS
*Director of the United States Patent and Trademark Office*